United States Patent [19]
Soneda et al.

[11] Patent Number: 5,856,918
[45] Date of Patent: Jan. 5, 1999

[54] INTERNAL POWER SUPPLY CIRCUIT

[75] Inventors: Mitsuo Soneda; Akira Li, both of Kanagawa, Japan

[73] Assignee: Sony Corporation, Japan

[21] Appl. No.: 743,825

[22] Filed: Nov. 5, 1996

[30] Foreign Application Priority Data

| Nov. 8, 1995 | [JP] | Japan | 7-290070 |
| Aug. 30, 1996 | [JP] | Japan | 8-230736 |

[51] Int. Cl.$^6$ .................................................. H02M 7/00
[52] U.S. Cl. .......................................... 363/60; 327/536
[58] Field of Search ......................... 363/59, 60; 327/535, 327/536

[56] References Cited

U.S. PATENT DOCUMENTS

| 3,824,447 | 7/1974 | Kuwabara . | |
| 4,106,086 | 8/1978 | Holbrook et al. | 363/60 |
| 4,199,806 | 4/1980 | Patterson, III | 363/60 |
| 4,398,099 | 8/1983 | Benoit-Gonin et al. | 327/536 |
| 4,433,282 | 2/1984 | Squires . | |
| 5,029,063 | 7/1991 | Lingstaedt et al. | 363/60 |
| 5,301,097 | 4/1994 | McDaniel | 363/60 |
| 5,397,931 | 3/1995 | Bayer | 327/534 |

FOREIGN PATENT DOCUMENTS

| 0403823 A1 | 12/1990 | European Pat. Off. . |
| 0 610 939 A1 | 8/1994 | European Pat. Off. . |
| 0678970 A2 | 10/1995 | European Pat. Off. . |
| 405009 | 1/1991 | Germany . |
| 7-264842 | 10/1995 | Japan . |

*Primary Examiner*—Matthew V. Nguyen
*Attorney, Agent, or Firm*—Ronald P. Kananen

[57] ABSTRACT

An internal power supply circuit, comprising a plurality of charge accumulators, a first power supply terminal, a second power supply terminal, a first switch for connecting the plurality of charge accumulators in parallel to each other in a first state, and a second switch for connecting the plurality of charge accumulators in series with each other in a second state, the charge accumulators connected between the first power supply terminal and the second power supply terminal at either the first state or the second state, and the first state and the second state set repeatedly to raise or lower a voltage between the first power supply terminal and the second power supply terminal.

38 Claims, 18 Drawing Sheets

FIG. 7A A 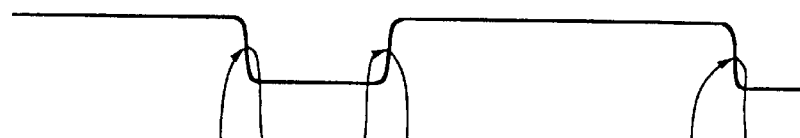
FIG. 7B B 
FIG. 7C C 
FIG. 7D D 
FIG. 7E ND$_1$ 
FIG. 7F CLK$_1$ 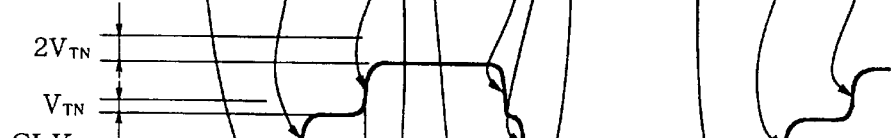
FIG. 7G CLK$_3$ 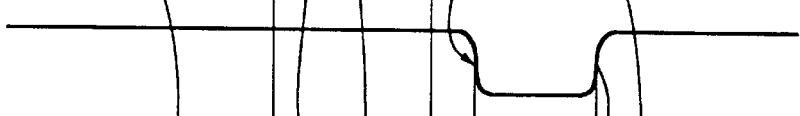
FIG. 7H CLK$_2$ 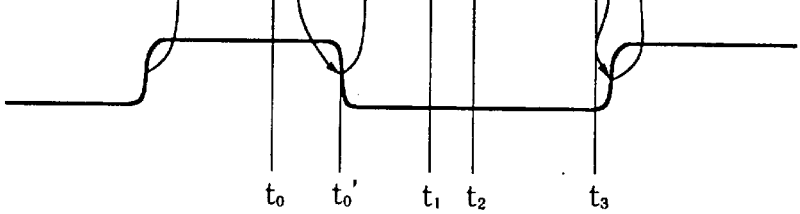
$t_0$  $t_0'$  $t_1$  $t_2$  $t_3$

INTERNAL POWER SUPPLY CIRCUIT

BACKGROUND OF THE INVENTION

1. Field of the Invention

The present invention relates to a power supply circuit. More particularly, the present invention relates to a booster circuit generating a voltage higher than an external power supply voltage by raising the voltage from the external power supply voltage or a down converter or other DC (direct current)-DC converter generating a voltage lower than the external power supply voltage by lowering the voltage from the external power supply voltage.

2. Description of the Related Art

In recent years, the practice in EEPROMs, flash memories, and other read only memories which can be electrically rewritten has been to supply only a single low power supply voltage from the outside, generate inside the chip an internal voltage higher than the voltage supplied from the outside, and write data into the memory by the high voltage inside the chip.

However, the voltage of the external power supply is being reduced as a general trend and the boosting efficiency decreases with the lower external voltage. Therefore, it has not been possible to generate an internal boosted voltage having a sufficient power.

On the other hand, the external power supply used is usually a 5 V single power supply, but it has become necessary to operate semiconductor devices at a lower internal voltage due to the desire to deal with the deterioration of the voltage resistance of semiconductor devices accompanying higher integration and the desire to reduce the power consumption.

However, the loss caused by the operation of a power supply circuit in the chip is large and obstructs the reduction of the power consumption.

SUMMARY OF THE INVENTION

An object of the present invention is to provide a power supply circuit able to decrease the number of charge pumping circuits used for obtaining a desired high voltage by increasing the efficiency of raising or lowering the voltage and to give a stable output voltage with a low power loss.

According to one aspect of the present invention, there is provided an internal power supply circuit comprising a plurality of charge accumulating means, a first power supply terminal, a second power supply terminal, a first switching means for connecting the plurality of charge accumulating means in parallel to each other in a first state, and a second switching means for connecting the plurality of charge accumulating means in series with each other in a second state, and a control means for energizing the first switching means or the second switching means in response to the first state or the second state to connect the plurality of charge accumulating means between the first power supply terminal and the second power supply terminal, and for deenergizing the first switching means or the second switching means in response to the first state or the second state to disconnect the plurality of charge accumulating means between the first power supply terminal and the second power supply terminal, the control means repeating the energizing and the deenergizing.

Preferably, the charge accumulating means are constituted by capacitors. First switching means is constituted by a third switching means and a fourth switching means. A partial booster circuit is may include a capacitor connected between a first node and a second node, the third switching means connected between the first node and the first power supply terminal, and the fourth switching means connected between the second node and the second power supply terminal. A plurality of the partial booster circuits are provided. The second switching means holds in a non-conductive state the first node of a front partial booster circuit and the second node of a rear partial booster circuit as a first state and holds them in a conductive state as a second state. The first switching means (comprised of the third switching means and the fourth switching means) is held in the conductive state and the second switching means is held in a non-conductive state in the first state; and the first switching (means comprised of the third switching means and the fourth switching means) is held in the non-conductive state and the second switching means is held in a conductive state in the second state so as to raise the voltage between the first power supply terminal and the second power supply terminal.

The internal power supply circuit of the present invention further comprises: a biasing means connected to the second node of the initial stage partial booster circuit for holding the second node at a constant potential: and a rectifying means connected between the first node of the final stage partial booster circuit and a boosted voltage output terminal.

Preferably, the biasing means is constituted by a switching means set in the conductive state when the first switching means comprised of the third and fourth switching means is non-conductive.

Preferably, the first power supply terminal is a positive power supply terminal and the second power supply terminal is a negative power supply terminal, the constant potential is the potential of the first power supply terminal, the biasing means is a rectification element connected so that a direction from the first power supply toward the second node of the initial stage partial booster circuit becomes a forward direction, and the rectification element is connected so that a direction from the first node of the final stage partial booster circuit toward the output terminal becomes the forward direction and supplies the positive boosted voltage to the output terminal.

Alternatively, the first power supply terminal may be a negative power supply terminal and the second power supply terminal may be a positive power supply terminal, the constant potential is the potential of the second power supply terminal, the biasing means is a rectification element connected so that a direction from the second node of the first stage partial booster circuit toward the first power supply terminal becomes the forward direction, and the rectification element is connected so that a direction from the output terminal to the first node of the final stage partial booster circuit becomes the forward direction and supplies the negative boosted voltage to the output terminal.

Preferably, the third switching means is constituted by a first conductivity type insulation gate type field effect transistor with a gate electrode connected to an input terminal of a first clock, with one diffusion layer connected to the first power supply, and with another diffusion layer connected to the first node of the partial booster circuit. The fourth switching means is constituted by a first conductivity type insulation gate type field effect transistor with a gate electrode connected to an input terminal of a second clock, with one diffusion layer connected to the second power supply, and with another diffusion layer connected to the second node of the partial booster circuit. The second switching means is constituted by a second conductivity type insulation gate type field effect transistor with a gate electrode connected to the input terminal of a third clock.

Preferably, the biasing means is constituted by a second conductivity type insulation gate type field effect transistor with a gate electrode connected to the input terminal of a third clock.

Preferably, an amplitude of the first clock is set larger than a potential difference between the first power supply terminal and the second power supply terminal.

Preferably, the first power supply terminal is a positive power supply terminal and the first conductivity type insulation gate type field effect transistor is an n-channel type transistor and is held at a higher level than the first power supply terminal voltage in a high level section of the first clock.

Alternatively, the first power supply is a negative power supply terminal and the first conductivity type insulation gate type field effect transistor is a p-channel type transistor and is held at a lower level than the second power supply terminal voltage in a low level section of the first clock.

Preferably, the second conductivity type insulation gate type field effect transistor constituting the second switching means is formed in an independent well.

Preferably, the biasing means is a second conductivity type insulation gate type field effect transistor formed in the same well as that for the second conductivity type insulator gate type field effect transistors constituting part of the peripheral logic circuit.

According to a second aspect of the present invention, there is provided an internal power supply circuit comprising a first power supply terminal, a second power supply terminal, a first node, a second node, a capacitor connected between the first node and the second node, a first switching means connected between the first node and the first power supply terminal, a second switching means connected between the second node and the second power supply terminal, a biasing means connected to the second node and biasing the node at a constant potential, and a rectifying means connected between the first node and the boosted voltage output terminal, the first and second switching means being repeatedly set in the conductive state and the non-conductive state to be overlapped thereby to output a boosted voltage to an output terminal.

Preferably, the biasing means is a rectification element connected so that a direction from the first power supply toward the second node becomes a forward direction, and the rectifying means is connected so that a direction from the first node toward the boosted voltage output terminal becomes the forward direction.

Preferably, the biasing means is a rectification element connected so that a direction from the second node toward the first power supply becomes a forward direction, and the rectifying means is connected so that a direction from the boosted voltage output terminal toward the first node becomes the forward direction.

Preferably, the charge accumulating means are constituted by capacitors. The capacitors are connected in series between the first and second power supply terminals and then are charged in the second state. The capacitors are connected in parallel between the second power supply terminal and a down voltage output terminal in the first state to thereby obtain a voltage between the first and second power supply terminal.

Preferably, further there is provided a switching means connecting to an external power supply between the voltage of the first power supply terminal and the voltage of the second power supply terminal, having at least one sub-power supply of a potential lower than the external power supply, and operationally connecting the external power supply and the sub-power supply and of a means for sequentially switching the connection and nonconnection state from the switching means connected to the external power supply to cause charging and discharging of the capacitors.

Preferably further there is provided a means for sequentially switching the connection and nonconnection state from the switching means connected to the sub-power supply to cause charging and discharging of the capacitors.

Preferably further there is provided at least two arrangements of a plurality of capacitors which are switched between the serial connection and parallel connection based on a clock signal and clock signals having inverse phases are supplied to the above at least two arrangements.

Preferably, the capacitors are composed of ferroelectric capacitors, high dielectric capacitors, MIM (metal-insulator-metal) configuration capacitors, DRAM trench and stack capacitors, planar capacitors, external capacitors, or MIS (metal-insulator-semiconductor) gate capacitors.

According to the present invention, by setting the first and second switching means in the conductive state and setting the third switching means in the nonconductive state, the capacitance element of each booster stage is charged to the differential voltage level between the first power supply and the second power supply. Then the first and second switching means are changed over to the nonconductive state and the third switching means is changed over to the conductive state, whereby the charged capacitance elements are connected in series between the constant potential and the output terminal of the power supply circuit and a positive or negative boosted voltage is output to the output terminal of the power supply circuit.

For this reason, the loss of the boosted voltage becomes only the voltage drop of the rectification element connected between the final stage and the output terminal, the reduction of the boosting efficiency accompanying the rise of the threshold voltage due to the substrate biasing effect can be avoided, and a reduction of the number of the booster stages for obtaining a desired high voltage and a shortening of the rising time of the boosted voltage can be achieved.

Further, according to the present invention, the value of the external power supply voltage is detected by a detecting circuit and the number of connections of the plurality of capacitance elements is switched in accordance with this detected voltage.

Then, the number of the capacitance elements set in accordance with the detected voltage are connected in series between the external power supply and the reference power supply and next connected in parallel and, at the same time, the connection and nonconnection states sequentially switched from the switching means connected to the external power supply to perform charging and discharging. Thus an output voltage of a value between the external power supply voltage and the reference power supply voltage is obtained.

Also, the switching between the serial connection and parallel connection of the capacitance elements is carried out based on the clock signal. Further, two systems of the plurality of capacitance elements are respectively driven by clock signals having inverse phases to each other. By this, the ripple accompanying the load current can be lowered.

Also, the capacitance element is comprised by an element having a high relative dielectric constant such as a ferroelectric capacitance, whereby the power loss is reduced.

BRIEF DESCRIPTION OF THE DRAWINGS

These and other objects and features of the present invention will become more apparent from the following description of the preferred embodiments made with reference to the drawings, in which:

FIGS. 7A to 7H are timing charts of an operation of the clock generating circuit shown in FIG. 5;

DESCRIPTION OF THE PREFERRED EMBODIMENTS

Figure 1:
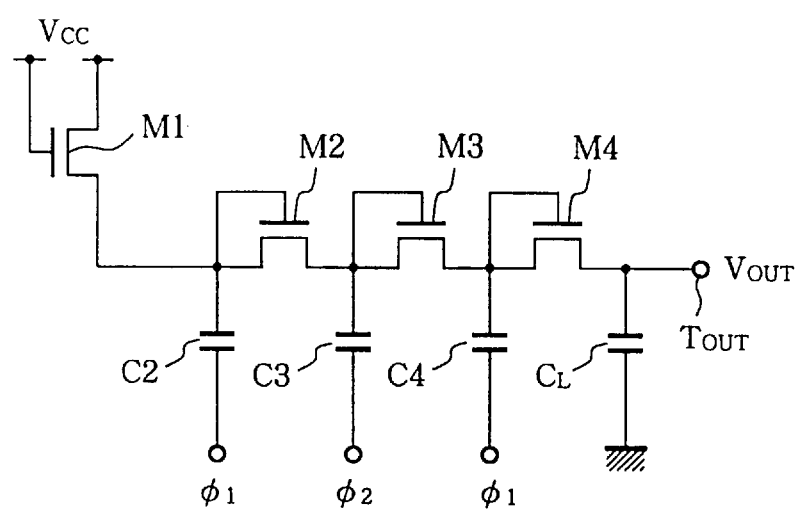
FIG. 1 is a circuit diagram of an example of an inner power supply circuit.

Erasing or writing an electrically erasable and programmable read only memory such as an EEPROM or flash memory requires a voltage higher than the supplied voltage. Therefore, various power supply circuits have been devised. FIG. 1 is a circuit diagram of a representative example of a conventional power supply circuit constituted by a booster circuit.

Note that, in FIG. 1, M1 to M4 are n-channel type MOS transistors, and $C_L$ is a load capacitor.

As illustrated, the power supply circuit of FIG. 1 is constituted by connecting a plurality of stages of partial circuits (booster stages) each comprising one capacitor, for example, C2, and one nMOS transistor, for example, M2, in series.

One of the electrodes of each of the capacitors C2, C3, C4 constituting a booster stage are connected to a common connecting point of the gate electrodes and drain diffusion layers of the nMOS transistors M2, M3, M4. The other electrodes of the capacitors C2, C3, C4 are alternately connected to either of supply lines of the clocks φ1 and φ2. The common connecting point of the gate electrodes and drain diffusion layers of the diode-connected n-channel type MOS transistors constituting the booster stages is connected to the source diffusion layer of the n-channel type MOS transistor of the booster stage of the front stage, while the source diffusion layer is connected to the common connecting point of the gate electrodes and the drain diffusion layers of the diode-connected n-channel type MOS transistors of the next stage.

Further, the order of connection of the clocks φ1 and φ2 is one where the odd number stages of the booster stages are connected to the clock φ1 and the even number stages are connected to the clock φ2.

The above power supply circuit constituted in this way attracts the charges from a semiconductor substrate on which a power supply voltage $V_{CC}$ and the present circuit are formed giving the clocks φ1 and φ2 by inverse phases and supplies a boosted voltage $V_{OUT}$ to an output terminal $T_{OUT}$.

In the above-described power supply circuit, a large number of stages of the diode-connected transistors are needed for obtaining a desired high voltage since a forward direction voltage drop corresponding to the threshold voltage $V_{TN}$ of the nMOS transistor is caused. Particularly, the nearer to the output terminal $T_{OUT}$ of the power supply circuit, the larger the reverse direction potential difference between the source and the substrate, so the larger the substrate biasing effect and the more the threshold voltage $V_{TN}$ of the transistor rises. Therefore, there is a disadvantage that the boosting efficiency is conspicuously lowered even if the number of stages is increased.

Preferred embodiments of the present invention will now be explained in further detail with reference to the drawings.

Figure 2:
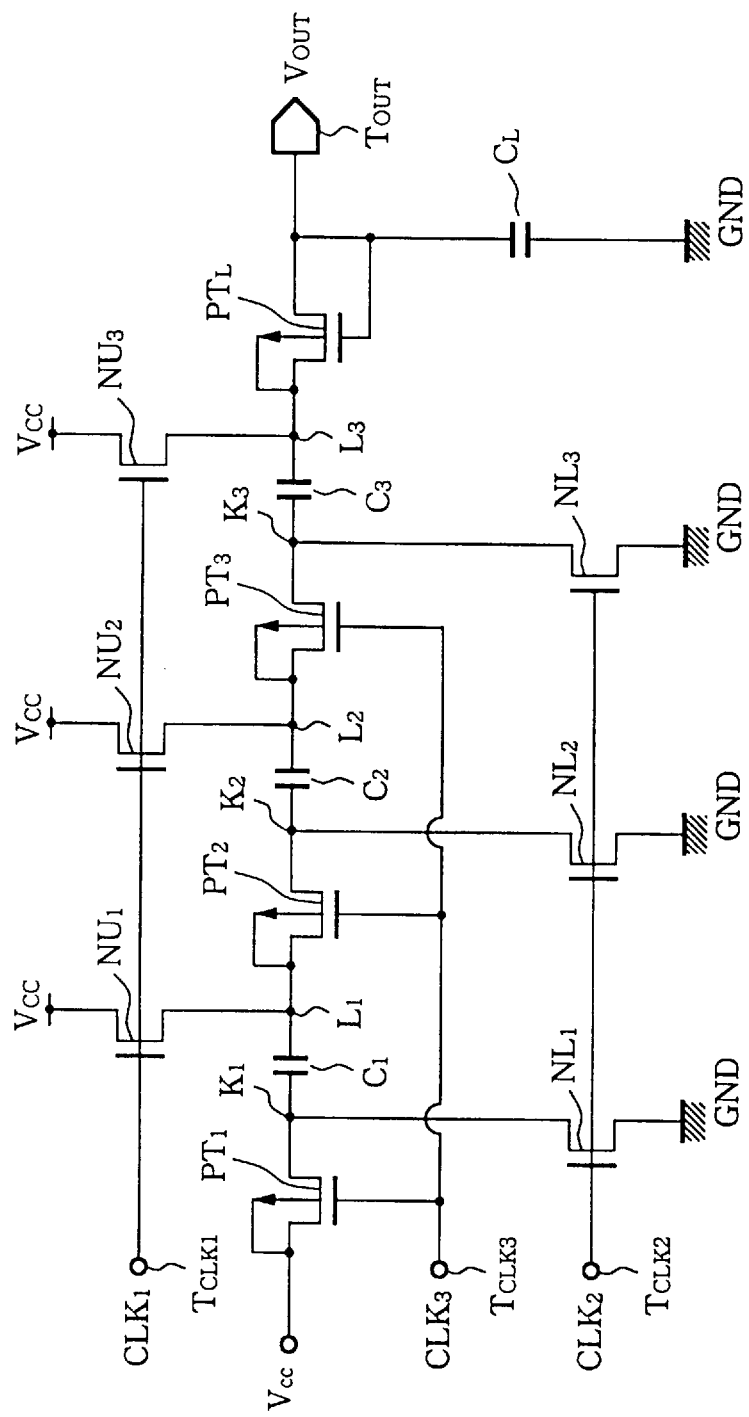
FIG. 2 is a circuit diagram of a first embodiment of an inner power supply circuit according to the present invention.

FIG. 2 is a circuit diagram of a first embodiment of the power supply circuit according to the present invention.

In FIG. 2, $CLK_1$, $CLK_2$, and $CLK_3$ denote clock signals, $T_{CLK1}$, $T_{CLK2}$, and $T_{CLK3}$ denote clock signal input terminals, $PT_1$ denotes a p-channel type (pMOS) transistor serving as a biasing means, $PT_2$ and $PT_3$ denote pMOS transistors serving as the third switching means, $PT_L$ denotes diode-connected pMOS transistor, $NU_1$, $NU_2$, and $NU_3$ denote n-channel MOS (nMOS) transistors serving as the first switching means, $NL_1$, $NL_2$, and $NL_3$ denote nMOS transistors serving as the second switching means, $K_1$, $K_2$, $K_3$, $L_1$, $L_2$, and $L_3$ denote nodes of the booster stages, $C_1$, $C_2$, and $C_3$ denote capacitance elements (capacitors) for boosting, $C_L$ denotes a parasitic capacitance of the load, and $T_{OUT}$ denotes an output terminal of the boosted voltage $V_{OUT}$.

Figure 3:
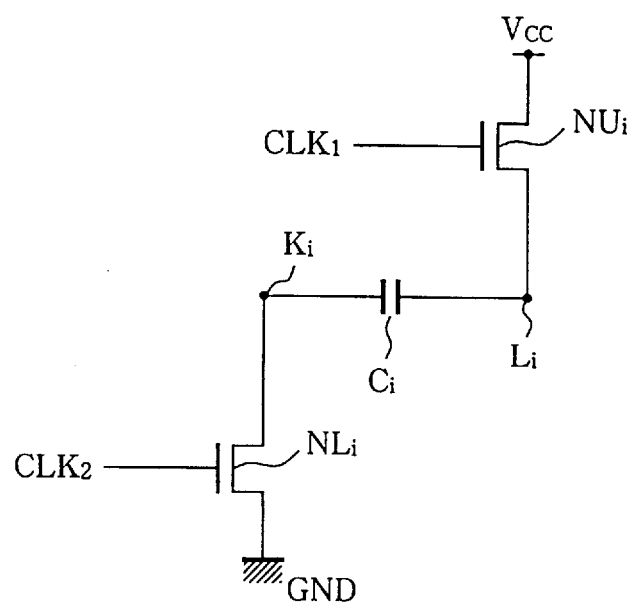
FIG. 3 is a circuit diagram of the configuration of a booster stage of the first embodiment shown in FIG. 2.

Note that the power supply circuit shown in FIG. 2 is constituted by the booster stages shown in FIG. 3.

Here, an explanation will be given of the configuration assuming that the booster stage shown in FIG. 3 is a booster stage of the i-th stage. As illustrated, the booster stage of i-th stage is constituted by a capacitor $C_i$, nodes $K_i$ and $L_i$, and nMOS transistors $NU_i$ and $NL_i$.

The capacitor $C_i$ is connected between the node $K_i$ and the node $L_i$.

The gate electrode of the nMOS transistor $NU_i$, is connected to the input terminal of the clock signal $CLK_1$, one diffusion layer is connected to the supply line of the power supply voltage $V_{hd\ CC}$, and the other diffusion layer is connected to the node $L_i$.

The gate electrode of the nMOS transistor $NL_i$ is connected to the input terminal of the clock signal $CLK_2$, one diffusion layer is connected to the node $K_i$, and the other diffusion layer is connected to the ground line.

The power supply circuit shown in FIG. 2 is configured with three stages of the booster stages shown in FIG. 3 connected in series.

As illustrated, the node $K_1$ of the booster stage of first stage is connected via the pMOS transistor $PT_1$ to the supply line of the power supply voltage $V_{CC}$. Namely, the source electrode of the pMOS transistor $PT_1$ is connected to the supply line of the power supply voltage $V_{CC}$, and the drain electrode is connected to the node $K_1$. The gate electrode of the pMOS transistor $PT_1$ is connected to the input terminal $T_{CLK3}$ of the clock signal $CLK_3$.

The node $L_1$ of the booster stage of the first stage is connected via the pMOS transistor $PT_2$ to the node $K_2$ of the booster stage of the second stage. Namely, the source electrode of the pMOS transistor $PT_2$ is connected to the node $L_1$ of the booster stage of the first stage, and the drain electrode is connected to the node $K_2$ of the booster stage of the second stage.

The gate electrode of the pMOS transistor $PT_2$ is connected to the input terminal $T_{CLK3}$ of the clock signal $CLK_3$.

The node $L_2$ of the booster stage of the second stage is connected via the pMOS transistor $PT_3$ to the node $K_3$ of the booster stage of the third stage. Namely, the source electrode of the pMOS transistor $PT_3$ is connected to the node $L_2$ of the booster stage of the second stage, and the drain electrode is connected to the node $K_3$ of the booster stage of the third stage.

The gate electrode of the pMOS transistor $PT_3$ is connected to the input terminal $T_{CLK3}$ of the clock signal $CLK_3$.

The node $L_3$ of the booster stage of the third stage is connected via the pMOS transistor $PT_L$ to the output terminal $T_{OUT}$ of the power supply circuit. Namely, the source electrode of the pMOS transistor $PT_L$ is connected to the node $L_3$ of the booster stage of the third stage, and the drain electrode is connected to the output terminal $T_{OUT}$ of the power supply circuit.

The gate electrode of the pMOS transistor $PT_L$ is connected to the output terminal $T_{OUT}$ commonly with the drain electrode. Namely, the pMOS transistors $PT_L$ are diode-connected.

Further, the output terminal $T_{OUT}$ is grounded via the load capacitor $C_L$.

Note that, in the power supply circuit shown in FIG. 2, the pMOS transistor $PT_1$ serving as the biasing means is for example formed in the same well as that of the other transistors constituting the peripheral circuits of the power supply circuit. pMOS transistors $PT_2$ and $PT_3$ are formed in each independent well as the third switching means.

Below, an explanation will be made of the boosting operation of the power supply circuit having the above configuration referring to the timing chart of FIGS. 4A to 4J.

Figure 4:
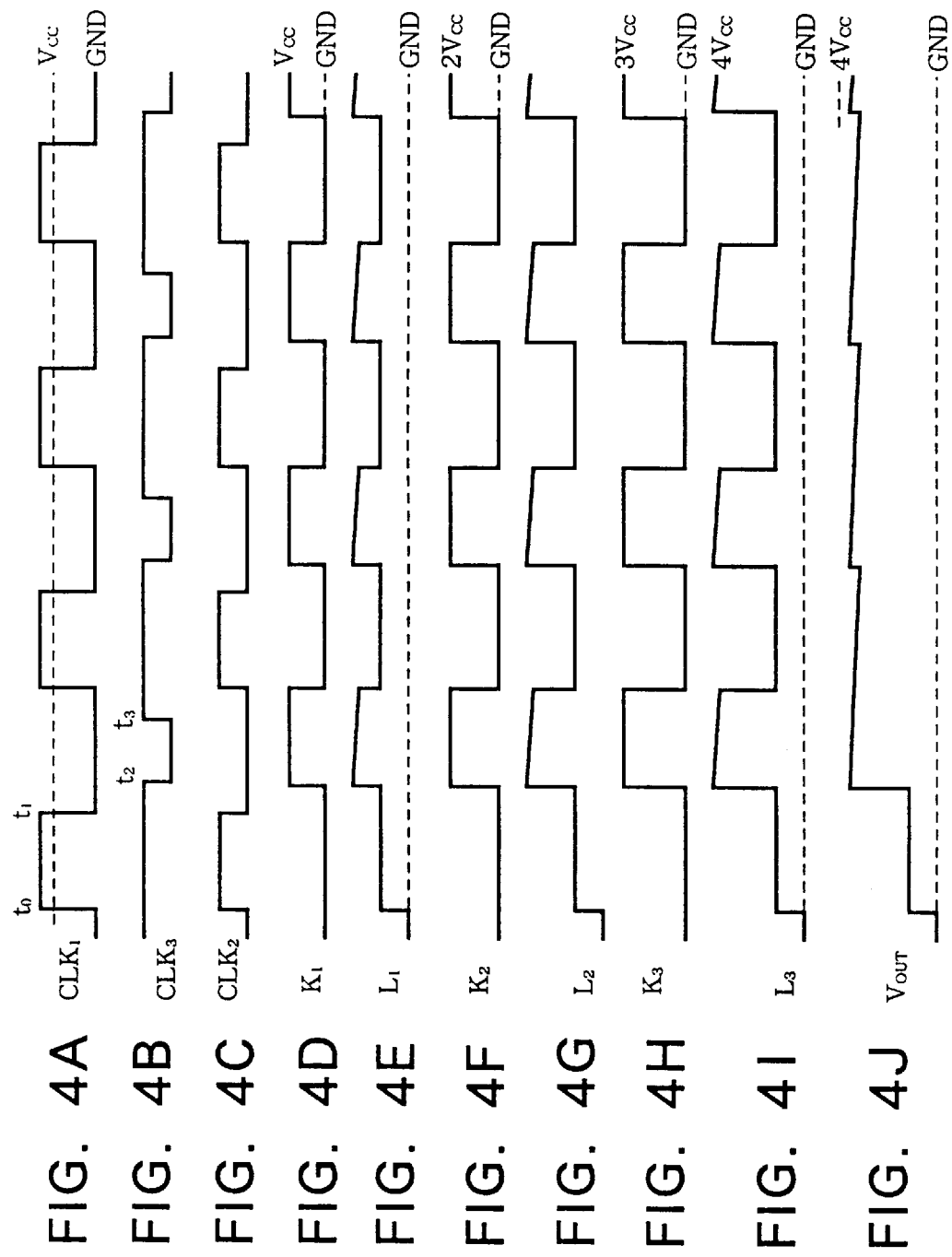
FIGS. 4A to 4J are timing charts of the power supply circuit of the first embodiment shown in FIG. 2.

At the time of the boosting operation, a clock signal $CLK_1$ is supplied to the gate electrodes of the nMOS transistors $NU_1$, $NU_2$, and $NU_3$ constituting the booster stages. As shown in FIG. 4A, the high level of the clock signal $CLK_1$ is held at a higher level than the power supply voltage $V_{CC}$, for example, a potential of $(V_{CC}+V_{TN})$. Note that, here, $V_{TN}$ is a threshold voltage of the nMOS transistors $NU_1$, $NU_2$, and $NU_3$.

For this reason, when the clock signal $CLK_1$ is held at a high level, a voltage higher than the power supply voltage $V_{CC}$, for example, a voltage of $(V_{CC}+V_{TN})$. is supplied to the gate electrodes of the nMOS transistors $NU_1$, $NU_2$, and $NU_3$ constituting the booster stages. The drain electrodes of these transistors are held at a potential of the same level as that of the power supply voltage $V_{CC}$.

The clock signal $CLK_2$ supplied to the gate electrodes of the nMOS transistors $NL_1$, $NL_2$, and $NL_3$ constituting the booster stages is held at a high level and low level in synchronization with the clock signal $CLK_1$. Note that, the high level of the clock signal $CLK_2$ is held at for example the power supply voltage $V_{CC}$ level.

When both of the clock signal $CLK_1$ and clock signal $CLK_2$ are held at the high level, all of the nMOS transistors $NU_1$, $NU_2$, and $NU_3$ and $NL_1$, $NL_2$, and $NL_3$ constituting the booster stages are set in the conductive state, and the clock signal $CLK_3$ supplied to the gate electrodes of the pMOS transistors $PT_1$, $PT_2$, and $PT_3$ connected between the booster stages is held at a high level, for example, the power supply voltage $V_{CC}$ level, therefore all of these pMOS transistors $PT_1$, $PT_2$, and $PT_3$ are held in the nonconductive state.

Due to this, during the period from a time $t_0$ to a time $t_1$ shown in FIGS. 4A and 4B, the clock signal $CLK_1$ and the clock signal $CLK_2$ are held at a high level, and the capacitors $C_1$, $C_2$ and $C_3$ existing in the booster stages are charged to for example the power supply voltage $V_{CC}$ level.

At the time $t_1$, both of the clock signal $CLK_1$ and clock signal $CLK_2$ are switched to the low level, therefore the nMOS transistors $NU_1$, $NU_2$, and $NU_3$ and $NL_1$, $NL_2$, and $NL_3$ constituting the booster stages are set in the nonconductive state at the time $t_2$.

Next, at the time $t_2$, the clock signal $CLK_3$ is switched from the high level to the low level, for example, the ground potential GND. In accordance with this, all of the pMOS transistors $PT_1$, $PT_2$, and $PT_3$ are switched to the conductive state.

Due to this, the capacitors $C_1$, $C_2$, and $C_3$ all charged to the power supply voltages $V_{CC}$ level are connected in series between the node $K_1$ of the first stage and the output terminal $T_{OUT}$ of the power supply circuit, and a voltage obtained by multiplying the power supply voltage by (number of booster stages +1) is obtained at one end of the capacitor of the final stage.

Here, when the number of the booster stages of the power supply circuit is defined as n and the threshold voltage of the pMOS transistors $PT_L$ diode-connected between the node $L_n$ of the booster stage of the final stage and the output terminal $T_{OUT}$ is defined as $V_{TP}$, the boosted voltage $V_{OUT}$ obtained by the power supply circuit $$V_{OUT}=(n+1){\times}V_{CC}-V_{TP} \qquad (1)$$

As shown in FIGS. 4D to 4J, after the pMOS transistors $PT_1$, $PT_2$, and $PT_3$ are all switched to the conductive state, the node $K_1$ of the booster stage of the first stage is held at the power supply voltage $V_{CC}$ level, and the node $L_1$ is held at the 2 $V_{CC}$ level.

The node $K_2$ of the second stage is held at 2 $V_{CC}$ in the same way as the node $L_1$ of the first stage, and the node $L_2$ of the second stage is held at 3 $V_{CC}$.

The node $K_3$ of the third stage is held at 3 $V_{CC}$ in the same way as the node $L_2$ of the second stage, and the node $L_3$ of the third stage is held at 4 $V_{CC}$, The pMOS transistors $PT_L$ are diode-connected. The connection is made so that the direction from the node $L_3$ of the third stage toward the output terminal $T_{OUT}$ becomes the forward direction, therefore the voltage of the node $L_3$ is output to the output terminal $T_{OUT}$. By this, the capacitor $C_L$ is charged, and a boosted voltage $V_{OUT}$ of substantially 4 $V_{CC}$ is output to the output terminal $T_{OUT}$.

Figure 5:
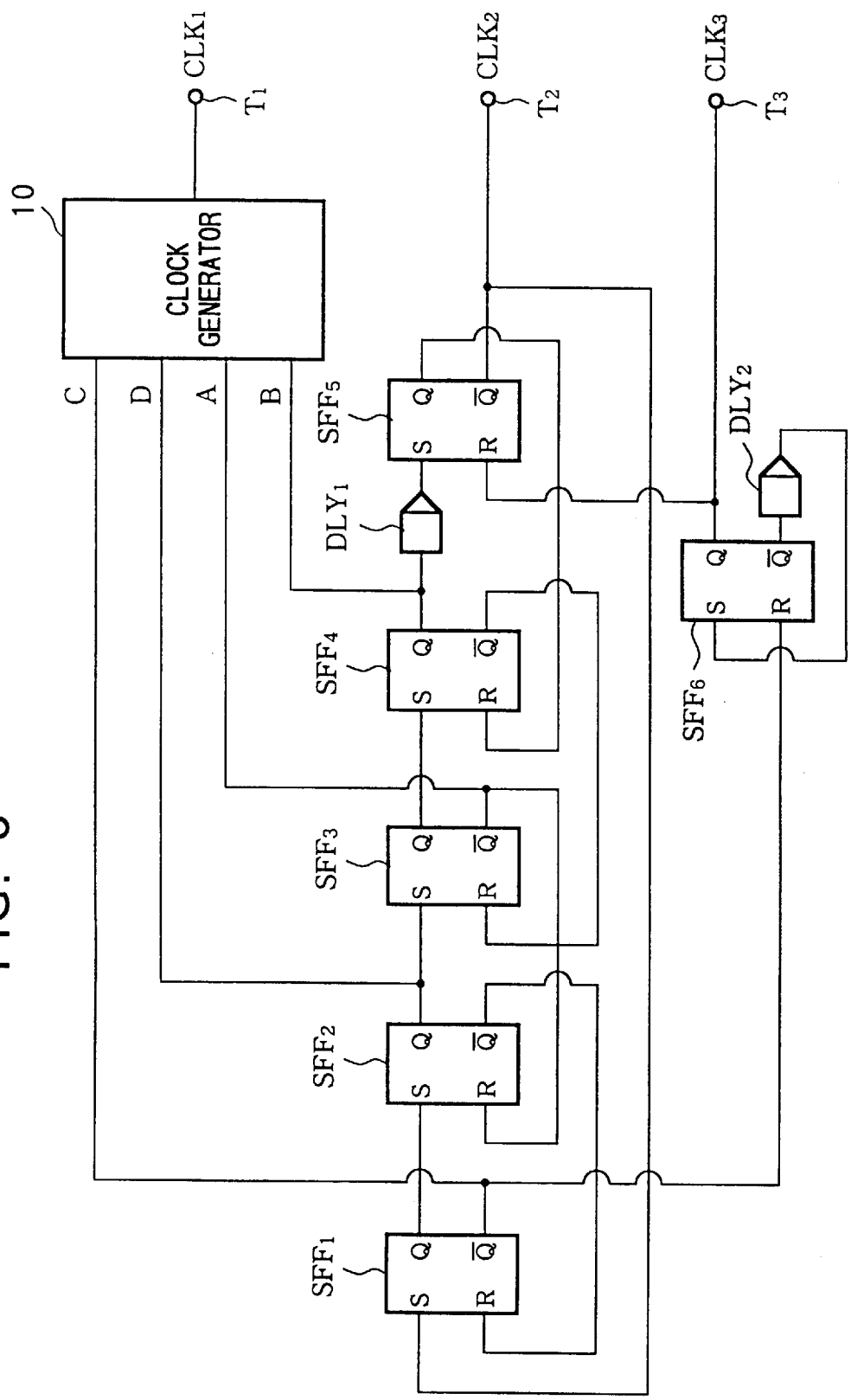
FIG. 5 is a circuit diagram of an example of a clock generating circuit supplying a clock signal to the power supply circuit of the first embodiment shown in FIG. 2.

FIG. 5 is a circuit diagram of a clock generating circuit showing an example of the circuit for generating the clock signals $CLK_1$, $CLK_2$, and $CLK_3$ shown in FIG. 2.

As illustrated, the clock generating circuit of the present example is constituted by RS flip-flops $RFF_1$, $RFF_2$, $RFF_3$, $RFF_4$, $RFF_5$, and $RFF_6$, a clock generator 10, and delay circuits $DLY_1$ and $DLY_2$.

Figure 6:
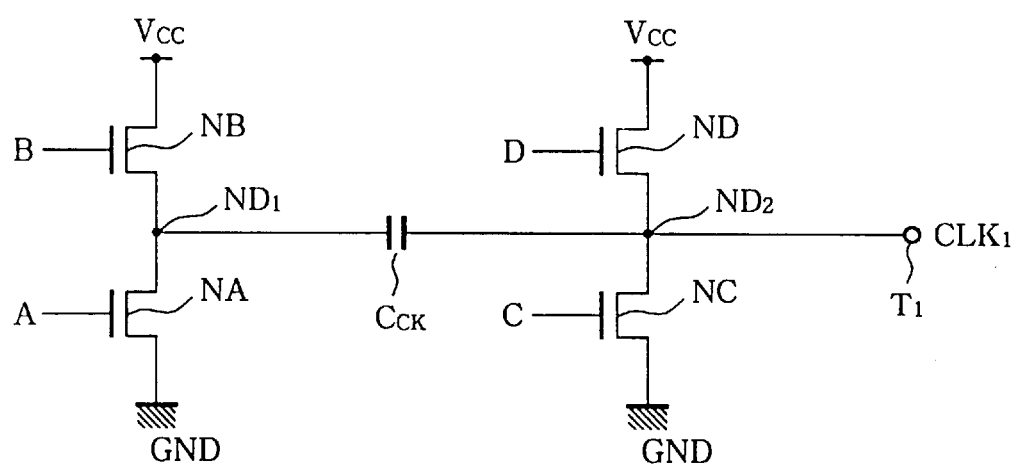
FIG. 6 is a circuit diagram of a boosting clock generator used in FIG. 5.

An example of the configuration of the clock generator 10 is shown in FIG. 6.

As illustrated, the clock generator 10 is constituted by the nMOS transistors NA, NB, NC, and ND and a capacitor $C_{CK}$.

One diffusion layer of the nMOS transistor NB is connected to the supply line of the power supply voltage $V_{CC}$, the other diffusion layer is connected to the node $ND_1$, and the gate electrode is connected to the input terminal of the clock signal B.

One diffusion layer of the nMOS transistor NA is connected to the node $ND_1$, the other diffusion layer is grounded, and the gate electrode is connected to the input terminal of the clock signal A.

One diffusion layer of the nMOS transistor ND is connected to the supply line of the power supply voltage $V_{CC}$, the other diffusion layer is connected to the node $ND_2$, and the gate electrode is connected to the input terminal of the clock signal D.

One diffusion layer of the nMOS transistor NC is connected to the node $ND_2$, the other diffusion layer is grounded, and the gate electrode is connected to the input terminal of the clock signal C.

A capacitor $C_{CK}$ is connected between the node $ND_1$ and the node $ND_2$, and the node $ND_2$ is connected to the output terminal $T_1$ of the clock signal $CLK_1$.

At the time of the boosting operation, the clock signals A, B, C, and D shown in FIGS. 7A to 7D are input to the clock generator 10.

Upon receipt of this, the clock generator 10 generates a clock signal $CLK_1$ held at a higher level than that of the power supply voltage $V_{CC}$ at the time of a high level.

As shown in FIG. 5, the set signal input terminal S of the RS flip-flop $RFF_1$ is connected to the inverted output terminal of the RS flip-flop $RFF_5$, and a reset signal input terminal R is connected to the inverted output terminal of the RS flip-flop $RFF_2$.

The output terminal of the RS flip-flop $RFF_1$ is connected to the set signal input terminal S of the RS flip-flop $RFF_2$, and the inverted output terminal is connected to the reset signal input terminal R of the RS flip-flop $RFF_6$.

Further, the inverted output signal of the RS flip-flop $RFF_1$ is output as the clock signal C to the clock generator 10.

The reset signal input terminal R of the RS flip-flop $RFF_2$ is connected to the inverted output terminal of the RS flip-flop $RFF_3$, and the output terminal is connected to the set signal input terminal S of the RS flip-flop $RFF_3$.

Further, the output signal of the RS flip-flop $RFF_2$ is supplied to the clock generator 10 as the clock signal D.

The reset signal input terminal R of the RS flip-flop $RFF_3$ is connected to the inverted output terminal of the RS flip-flop $RFF_4$, and the output terminal is connected to the set signal input terminal S of the RS flip-flop $RFF_4$.

Further, the inverted output signal of the RS flip-flop $RFF_3$ is supplied to the clock generator 10 as the clock signal A.

The reset signal input terminal R of the RS flip-flop $RFF_4$ is connected to the inverted output terminal of the RS flip-flop $RFF_5$, and the output terminal is connected to the set signal input terminal S of the RS flip-flop $RFF_5$ via the delay circuit $DLY_1$.

Further, the output signal of the RS flip-flop $RFF_4$ is supplied to the clock generator 10 as the clock signal B.

The reset signal input terminal R of the RS flip-flop $RFF_5$ is connected to the output terminal of the RS flip-flop $RFF_6$, and the inverted output terminal is connected to the output terminal $T_2$ of the clock signal $CLK_2$.

The reset signal input terminal R of the RS flip-flop $RFF_6$ is connected to the inverted output terminal of the RS flip-flop $RFF_1$, the set signal input terminal S is connected to the output terminal of the delay circuit $DLY_2$, and the input terminal of the delay circuit $DLY_2$ is connected to the inverted output terminal of the RS flip-flop $RFF_6$.

The output terminal of the RS flip-flop $RFF_6$ is connected to the output terminal $T_3$ of the clock signal $CLK_3$.

Below, referring to the timing chart shown in FIGS. 7A to 7H, the operation of the clock generating circuit having the above configuration will be explained.

The clock generating circuit shown in FIG. 5 generates the clock signals A, B, C, and D shown in FIGS. 7A to 7H and the clock signals $CLK_1$, $CLK_2$, and $CLK_3$.

Note that, the clock signals A, B, C, and D are clock signals alternately taking a high level, for example, the power supply voltage $V_{CC}$ level, and a low level, for example, the ground potential GND level.

Similarly, the clock signals $CLK_2$ and $CLK_3$ are clock signals alternately taking a high level, for example, the power supply voltage $V_{CC}$ level, and a low level, for example, the ground potential GND level.

The clock signals A, B, C, and D are input to the clock generator 10. The clock generator 10 generates a clock signal $CLK_1$ which is held at a level of more than the power supply voltage $V_{CC}$ at the time of the high level and is held at, for example, the ground potential GND level at the time of the low level.

As shown in FIG. 6, when both of the clock signal D and the clock signal A are held at the high level and both of the clock signal B and the clock signal C are held at the low level, the nMOS transistors NA and ND are held in the conductive state, and the nMOS transistors NB and NC are held in the nonconductive state.

By this, the node $ND_1$ is held at the ground potential GND level, and the node $ND_2$ side is held at a voltage reduced from the power supply voltage $V_{CC}$ by exactly the threshold voltage $V_{TN}$ of the nMOS transistor ND, therefore the capacitor $C_{CK}$ is charged to $(V_{CC}-V_{TN})$ Further, at this time, the voltage of $(V_{CC}-V_{TN})$ level is output to the output terminal $T_1$ of the clock signal $CLK_1$.

Then, at the time $t_0$ shown in FIGS. 7A to 7H, the clock signal B is switched from the low level to the high level. Also, at this time, both of the clock A and clock C are held at the low level, and the nMOS transistors NA and NC are set in the nonconductive state.

In accordance with this, the nMOS transistor NB is switched to the conductive state, and the node $ND_1$ is held at a voltage reduced from the power supply voltage $V_{CC}$ by exactly the threshold voltage $V_{TN}$ of the nMOS transistor NB, that is, $(V_{CC}-V_{TN})$. By this, the node $ND_2$ is held at $2(V_{CC}-V_{TN})$ At this time, as shown in FIG. 7F, the voltage of the output terminal $T_1$ of the clock signal $CLK_1$ rises by one stage and becomes $2(V_{CC}-V_{TN})$, that is, is held at a higher level than that of the power supply voltage $V_{CC}$.

Subsequently, at the time $t_0'$, the clock signal B is switched from the high level to the low level, and the clock signal A is switched from the low level to the high level in accordance with this. Further, in accordance with this, the clock signal C is switched to the high level, and the clock signal D is switched to the low level.

For this reason, at the time $t_1$, the potentials of the nodes $ND_1$ and $ND_2$ are switched to the ground potential, and the output terminal $T_1$ of the clock signal $CLK_1$ is held at the ground potential. Then, at the time $t_2$, the clock signal $CLK_3$ is switched from the high level to the low level.

At the time $t_3$, the clock signal $CLK_2$ and the clock signal $CLK_3$ are switched from the low level to the high level. In accordance with this, the clock signal C is switched to the low level and the clock signal D is switched to the high level, therefore, the capacitor $C_{CK}$ is charged to $(V_{CC}-V_{TN})$ again.

In this way, the clock generating circuit shown in FIG. 5 generates the clock signal $CLK_1$ which is held at $2(V_{CC}-V_{TN})$ level at the time of the high level and held at the ground potential at the time of the low level and the clock signal $CLK_2$ and the clock signal $CLK_3$ which are held at the power supply voltage $V_{CC}$ level at the time of the high level and held at the ground potential at the time of the low level and supplies them to the power supply circuit shown in FIG. 2.

As explained above, according to the present embodiment, the clock signal $CLK_1$ held at a higher level than the power supply voltage $V_{CC}$ at the time of the high level is supplied to the gate electrodes of the nMOS transistors $NU_1$, $NU_2$, and $NU_3$ constituting the booster stages, the clock signal $CLK_2$ is supplied to the gate electrodes of the nMOS transistors $NL_1$, $NL_2$, and $NL_3$, the clock signal $CLK_3$ is supplied to the gate electrodes of the pMOS transistors $PT_1$, $PT_2$, and $PT_3$ connected between the booster stages, the clock signals $CLK_1$ and $CLK_3$ are held at the high level, and the capacitors $C_1$, $C_2$, and $C_3$ of the booster stages are charged to the power supply voltage $V_{CC}$ level, then the clock signals $CLK_1$ and $CLK_2$ are switched to the low level, the clock signal $CLK_3$ is switched to the high level, and the boosted voltage $V_{OUT}$ is supplied to the output terminal $T_{OUT}$ of the power supply circuit, therefore there is no loss of the boosted voltage due to the substrate biasing effect at the time of boosting, the number of stages necessary for obtaining the desired high voltage can be decreased, the output current per chip area can be made larger, and the rising time can be shortened.

Figure 8:
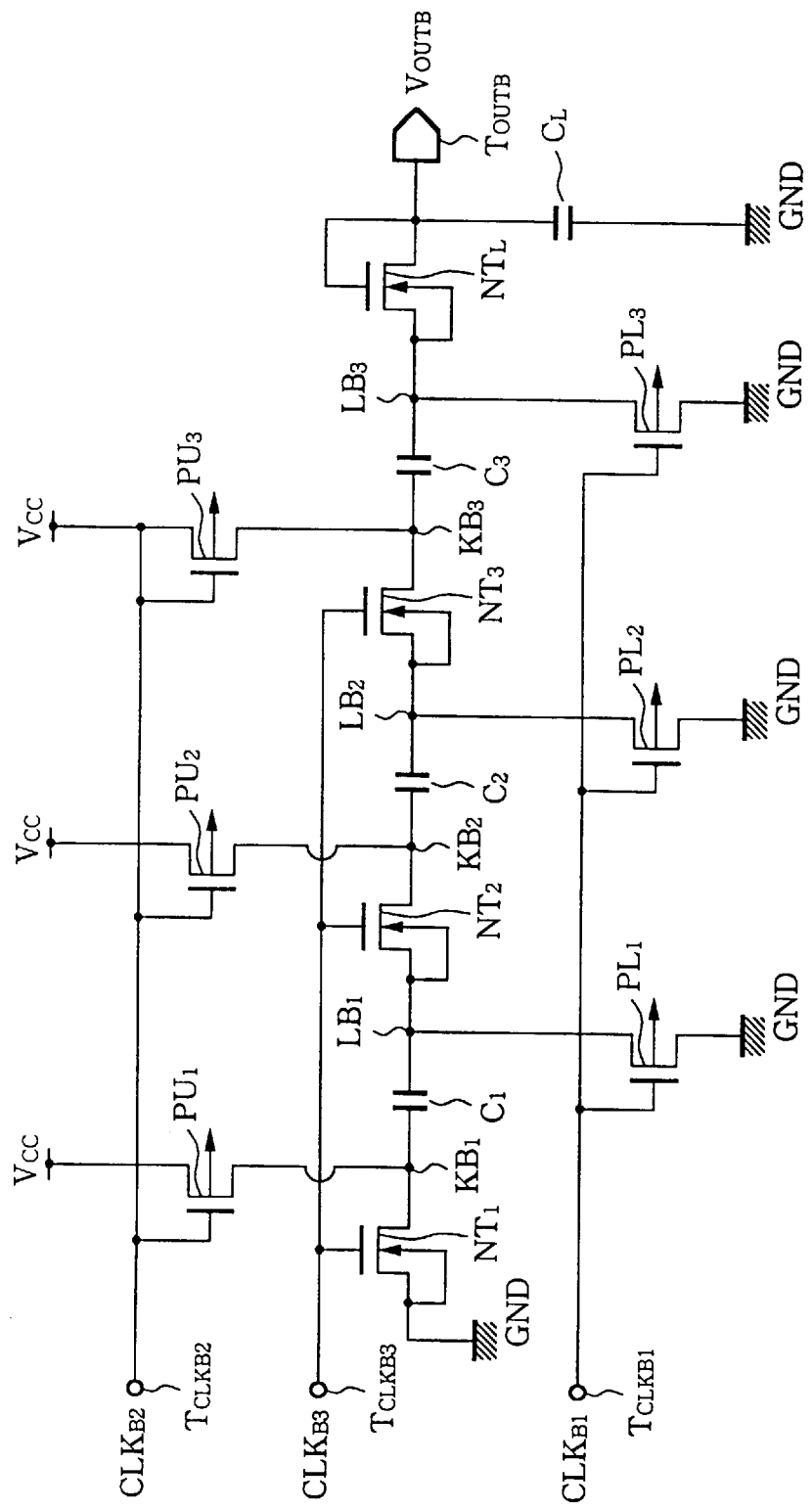
FIG. 8 is a circuit diagram of a second embodiment of the power supply circuit according to the present invention.

FIG. 8 is a circuit diagram of a second embodiment of the power supply circuit according to the present invention.

As illustrated, FIG. 8 is a circuit diagram of the power supply circuit showing an example of the negative booster circuit for generating a negative boosted voltage compared with the power supply voltage $V_{CC}$. The power supply circuit can be used for biasing for example a structure of a semiconductor circuit such as a dynamic random access memory.

In FIG. 8, $CLK_{B2}$ and $CLK_{B3}$ are inverted signals of the clock signals $CLK_2$ and $CLK_3$ shown in FIG. 1, and $CLK_{B1}$ is a clock signal which is held at the power supply voltage $V_{CC}$ level at the time of the high level in synchronization with the clock signal $CLK_{B2}$ and held at a level lower than the ground potential GND, that is, a negative potential at the time of the low level.

$T_{CLKB1}$, $T_{CLKB2}$, and $T_{CLKB3}$ denote input terminals of the clock signals $CLK_{B1}$, $CLK_{B2}$, and $CLK_{B3}$, $NT_1$ denotes an nMOS transistor serving as the biasing means, $NT_2$ and $NT_3$ denote nMOS transistors serving as the third switching means, $NT_L$ denotes diode-connected nMOS transistor, $PL_1$, $PL_2$, and $PL_3$ denote pMOS transistors serving as the first switching means, $PU_1$, $PU_2$, and $PU_3$ denote pMOS transistors serving as the second switching means, $KB_1$, $KB_2$, $KB_3$, $LB_1$, $LB_2$, and $LB_3$ denote nodes of booster stages, $C_1$, $C_2$, and $C_3$ denote capacitors for boosting, $C_L$ denotes a parasitic capacitance of the load, and $T_{OUTB}$ denotes an output terminal of the negative boosted voltage $V_{OUTB}$.

As illustrated, the power supply circuit of the present example was constituted by three booster stages constituted by pMOS transistors $PU_1$, $PU_2$, $PU_3$, $PL_1$, $PL_2$, and $PL_3$ and capacitors $C_1$, $C_2$, and $C_3$.

Here, an explanation will be made of the configuration of the i-th stage of the booster stage constituted by the pMOS transistors $PU_i$ and $PL_i$ and the capacitor $C_i$ referring to FIG. 9 without losing generality.

Figure 9:
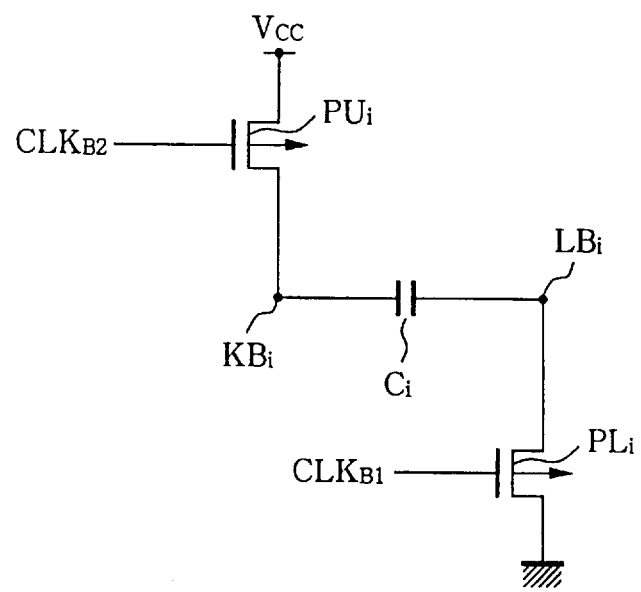
FIG. 9 is a circuit diagram of the configuration of the booster stage of a second embodiment shown in FIG. 8.

As shown in FIG. 9, the gate electrode of the pMOS transistor $PU_i$ is connected to the input terminal of the clock signal $CLK_{B2}$, the source electrode is connected to the supply line of the power supply voltage $V_{CC}$, and the drain electrode is connected to the node $KB_i$ of the booster stage.

The gate electrode of the pMOS transistor $PL_i$ is connected to the input terminal of the clock signal $CLK_{B1}$, the source electrode is connected to the node $LB_i$ and the drain electrode is grounded.

One electrode of the capacitor $C_i$ is connected to the node $KB_i$, and the other electrode is connected to the node $LB_i$.

FIGS. 10A to 10J are waveform diagrams of the clock signals $CLK_{B1}$, $CLK_{B2}$, and $CLK_{B3}$, the voltages of the boosting nodes $KB_1$, $LB_1$, $KB_2$, $LB_2$, $KB_3$, and $LB_3$, and the output voltage $V_{OUTB}$.

Figure 10:
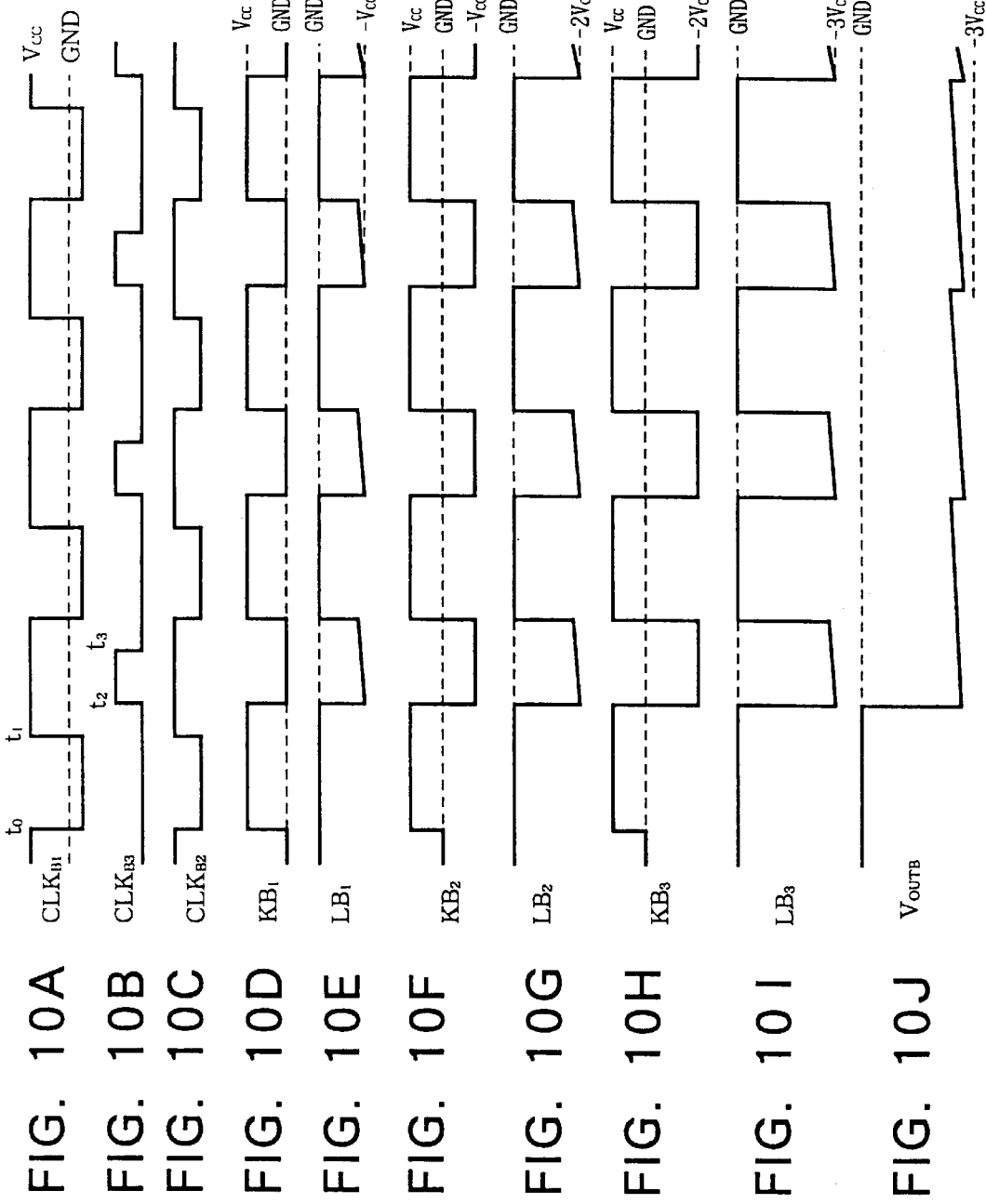
FIGS. 10A to 10J are timing charts of the power supply circuit of the second embodiment shown in FIG. 8.

As shown in FIGS. 10A and 10C, the clock signal $CLK_{B1}$ and the clock signal $CLK_{B2}$ are synchronous. The clock signal $CLK_{B1}$ is held at the power supply voltage $V_{CC}$ level at the time of the high level and is held at the level lower than the ground potential GND, that is, a negative potential, at the time of the low level. The clock signal $CLK_{B2}$ is held at the power supply voltage $V_{CC}$ level at the time of the high level and is held at the ground potential GND level at the time of the low level.

Below, an explanation will be made of the operation of the negative booster circuit of the present invention referring to the waveform diagram shown in FIGS. 10A to 10J.

As shown in FIG. 10A, at the time $t_0$, the clock signals $CLK_{B1}$ and $CLK_{B2}$ are switched from the high level to the low level. The clock signal $CLK_{B1}$ is held at the negative potential and the clock signal $CLK_{B2}$ is held at the ground potential GND level.

During the period where the clock signal $CLK_{B1}$ and the clock signal $CLK_{B2}$ are held at the low level, the pMOS transistors $PU_1$, $PU_2$, and $PU_3$ and the pMOS transistors $PL_1$, $PL_2$, and $PL_3$ are held in the conductive state, and the capacitors $C_1$, $C_2$, and $C_3$ are charged.

For this reason, at the booster stages, the nodes $LB_1$, $LB_2$, and $LB_3$ are held at the ground potential GND level, the nodes $KB_1$, $KB_2$, and $KB_3$ are held at the power supply voltage $V_{CC}$ level, and the capacitors $C_1$, $C_2$, and $C_3$ are charged to the power supply voltage $V_{CC}$ level.

At the time $t_1$, the clock signals $CLK_{B1}$ and $CLK_{B2}$ are switched from the low level to the high level, and the pMOS transistors $PU_1$, $PU_2$, and $PU_3$ and the pMOS transistors $PL_1$, $PL_2$, and $PL_3$ are switched to the nonconductive state.

Further, at the time $t_2$, the clock signal $CLK_{B3}$ is switched from the low level to the high level, and the nMOS transistors $NT_1$, $NT_2$, and $NT_3$ are switched to the conductive state in accordance with this.

According to this, at the booster stage of initial stage, the node $KB_1$ is held at the ground potential GND level, and the node $LB_1$ is held at the $-V_{CC}$ level.

In the booster stage of the second stage, the node $KB_2$ is held at the $-V_{CC}$ level in the same way as the node $LB_1$, and the node $KB_2$ is held at the $-2\,V_{CC}$ level.

In the booster stage of the third stage, the node $KB_3$ is held at the $-2 V_{CC}$ level in the same way as the node $LB_2$, and the node $KB_3$ is held at the $-3 V_{CC}$ level.

The potential of the node $LB_3$ is output to the output terminal $T_{OUTB}$ via the diode-connected nMOS transistors $NT_L$. Here, when defining the threshold voltage of the nMOS transistor $NT_L$ as $V_{TN}$, the negative boosted voltage $V_{OUTB}$ output to the output terminal $T_{OUTB}$ becomes $-(3 V_{CC}-V_{TN})$.

In general, the boosted voltage $V_{OUTB}$ obtaining by the negative booster circuit constituted by n number of stages of booster stages is found by the following equation:

$$V_{OUTB} = -(n \times V_{CC} - V_{TN}) \quad (2)$$

In this way, the voltage loss of the boosted voltage $V_{OUTB}$ obtained by the negative booster circuit shown in FIG. 8 is only the voltage drop in the diode-connected between the final stage and the output terminal $T_{OUTB}$, and an improvement of the efficiency of the power supply circuit can be achieved.

Note that, in the negative booster circuit of the present embodiment, in the same way as the positive booster circuit shown in FIG. 2, the nMOS transistor $NT_1$ is formed in the same well as that for the other transistors constituting the peripheral circuit of for example the negative booster circuit, and nMOS transistors $NT_2$ and $NT_3$ are formed individually in independent wells.

Figure 11:
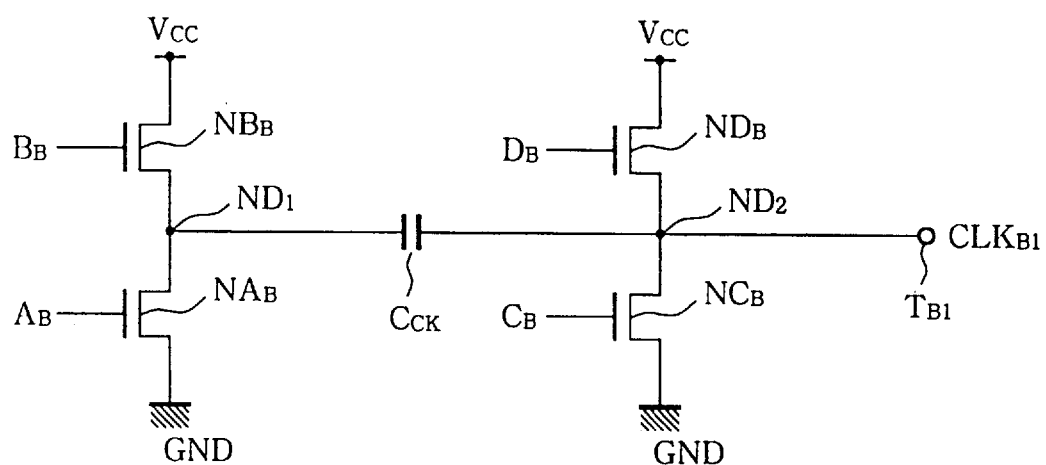
FIG. 11 is a circuit diagram of a boosting clock generator used in FIG. 8.
Figure 12:
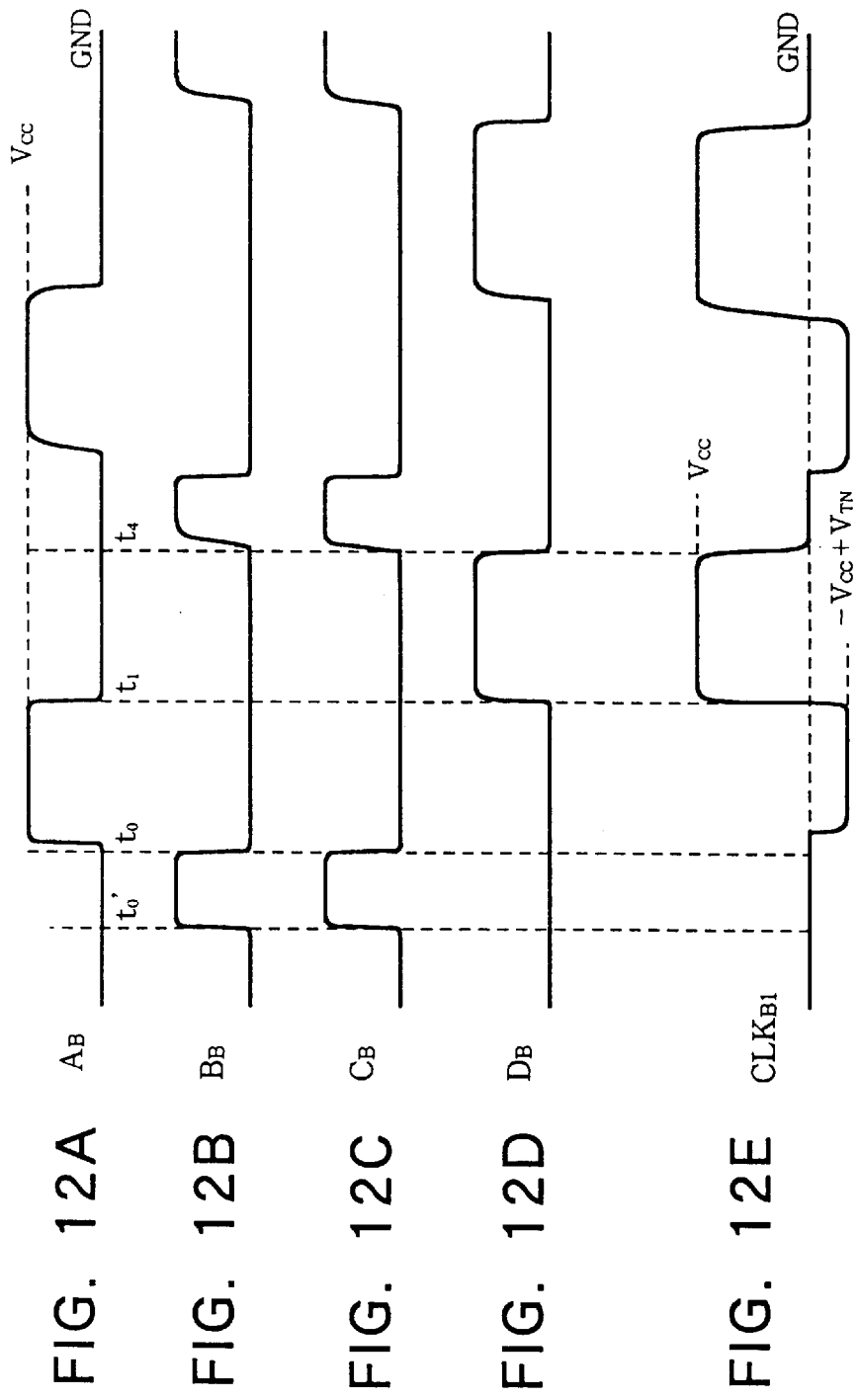
FIGS. 12A to 12E are timing charts of an operation of the clock generating circuit shown in FIG. 8.

FIG. 11 is a circuit diagram of an example of the generator 10a of the clock signal $CLK_{B1}$ in the second embodiment.

As illustrated, the clock generator 10a is constituted by the nMOS transistors $NA_B$, $NB_B$, $NC_B$, and $ND_B$ and the capacitor $C_{CK}$.

One diffusion layer of the nMOS transistor $NB_B$ is connected to the supply line of the power supply voltage $V_{CC}$, the other diffusion layer is connected to the node $ND_1$, and the gate electrode is connected to the input terminal of the clock signal $B_B$.

One diffusion layer of the nMOS transistor $NA_B$ is connected to the node $ND_1$, the other diffusion layer is grounded, and the gate electrode is connected to the input terminal of the clock signal $A_B$.

One diffusion layer of the nMOS transistor $ND_B$ is connected to the supply line of the power supply voltage $V_{CC}$, the other diffusion layer is connected to the node $ND_2$, and the gate electrode is connected to the input terminal of the clock signal $D_B$.

One diffusion layer of the nMOS transistor $NC_B$ is connected to the node $ND_2$, the other diffusion layer is grounded, and the gate electrode is connected to the input terminal of the clock signal $C_B$.

A capacitor $C_{CK}$ is connected between the node $ND_1$ and the node $ND_2$ and the node $ND_2$ is connected to the output terminal $T_{B1}$ of the clock signal $CLK_{B1}$.

At the time of the boosting operation, the clock signals $A_B$, $B_B$, $C_B$, and $D_B$ shown in FIGS. 12A to 12D are input to the clock generator 10a.

Upon receipt of these clock signals, the clock generator 10a generates a clock signal $CLK_{B1}$ which is held at the power supply voltage $V_{CC}$ at the time of the high level and is held at a lower level than the ground potential GND at the time of the low level.

Below, an explanation will be made of the operation of the generator 10a of the clock signal $CLK_{B1}$ shown in FIG. 11 referring to the waveform diagram of the clock signals $A_B$, $B_B$, $C_B$, and $D_B$ and the clock signal $CLK_{B1}$ shown in FIGS. 12A to 12E.

As shown in FIGS. 12A to 12D, at the time $t_0'$, the clock signals $B_B$ and $C_B$ are switched to the high level, for example, the power supply voltage $V_{CC}$ level. Note that, at this time, both of the clock signals $A_B$ and $D_B$ are held at the low level, for example, the ground potential GND.

In accordance with this, in the clock generator 10a, the nMOS transistors $NA_B$ and $ND_B$ are set in the nonconductive state, and both of the nMOS transistors $NB_B$ and $NC_B$ are set in the conductive state.

For this reason, the capacitor $C_{CK}$ is charged, and the node $ND_1$ is held at a voltage which becomes lower than the power supply voltage $V_{CC}$ by exactly the threshold voltage $V_{TN}$ of the nMOS transistor $NB_B$, that is, $(V_{CC}-V_{TN})$.

Then, at the time $t_0$, the clock signals $B_B$ and $C_B$ are switched to the low level, and the clock signal $A_B$ is raised to the high level, for example, the power supply voltage $V_{CC}$ level. Note that, at this time, the clock signal $D_B$ is held at the low level as it is.

In accordance with this, both of the nMOS transistors $NB_B$ and $NC_B$ are switched to the nonconductive state, and the nMOS transistor $NA_B$ is switched to the conductive state. Further, the nMOS transistor $ND_B$ is held in the nonconductive state as it is. For this reason, the node $ND_1$ is held at the ground potential GND, and the node $ND_2$ is held at the negative potential, for example $-(V_{CC}-V_{TN})$.

Subsequently, at the time $t_1$, the clock signal $A_B$ is switched to the low level, and the clock signal $D_B$ is raised to the high level, for example, the power supply voltage $V_{CC}$. In accordance with this, the nMOS transistor $NA_B$ is switched to the nonconductive state, and the nMOS transistor $ND_B$ is switched to the conductive state.

Note that, at this time, the clock signals $B_B$ and $C_B$ are held at the low level, and both of the nMOS transistors $NB_B$ and $NC_B$ are held in the nonconductive state, therefore the node $ND_2$ is held at the power supply voltage $V_{CC}$ level.

Then, at the time $t_4$, the clock signal $D_B$ is switched to the low level, and both of the clock signals $B_B$ and $C_B$ are raised to the high level, therefore both of the nMOS transistors $NB_B$ and $NC_B$ are set in the conductive state, and the capacitor $C_{CK}$ is charged and the node $ND_1$ is held at the $(V_{CC}-V_{TN})$ level.

The above operation is repeatedly carried out, therefore the clock generatory 10a shown in FIG. 11 generates a clock signal $CLK_{B1}$ which is held at a level lower than the ground potential GND during the low level section and is held at the power supply voltage $V_{CC}$ level in the high level section and outputs the same from the output terminal $T_{B1}$. Then, this clock signal $CLK_{B1}$ is supplied to the negative booster circuit shown in FIG. 8, and the negative boosted voltage $V_{OUTB}$ is generated.

As explained above, according to the present embodiment, the clock signal $CLK_{B2}$ is applied to the gate electrodes of the pMOS transistors $PU_1$, $PU_2$, and $PU_3$ constituting the booster stages, the clock signal $CLK_{B1}$ which is held at the power supply voltage $V_{CC}$ level at the time of the high level and is held at the negative potential at the time of the low level is supplied to the gate electrodes of the pMOS transistors $PL_1$, $PL_2$, and $PL_3$, the clock signal $CLK_{B3}$ is supplied to the gate electrodes of the nMOS transistors $NT_1$, $NT_2$, and $NT_3$ connected between the booster stages, the clock signals $CLK_{B1}$ and $CLK_{B2}$ are held at the low level, and the capacitors $C_1$, $C_2$, and $C_3$ of the booster stages are charged to the power supply voltage $V_{CC}$ level, then the clock signals $CLK_{B1}$ and $CLK_{B2}$ are switched to the high level, the clock signal $CLK_{B3}$ is switched to the high level, and the negative boosted voltage $V_{OUTB}$ is output to the output terminal $T_{OUTB}$, therefore there is no loss of the boosted voltage due to the substrate biasing effect at the time of boosting, the number of stages necessary for obtaining the desired high voltage can be decreased, the output current per chip area can be made larger, and the rising time can be shortened.

Also, in recent years, there have been growing demands for a low voltage (for example $V_{CC}/m$) source independent from the power supply voltage $V_{CC}$ inside an LSI, for example, for a small amplitude transfer between chips and inside a chip.

Figure 13:
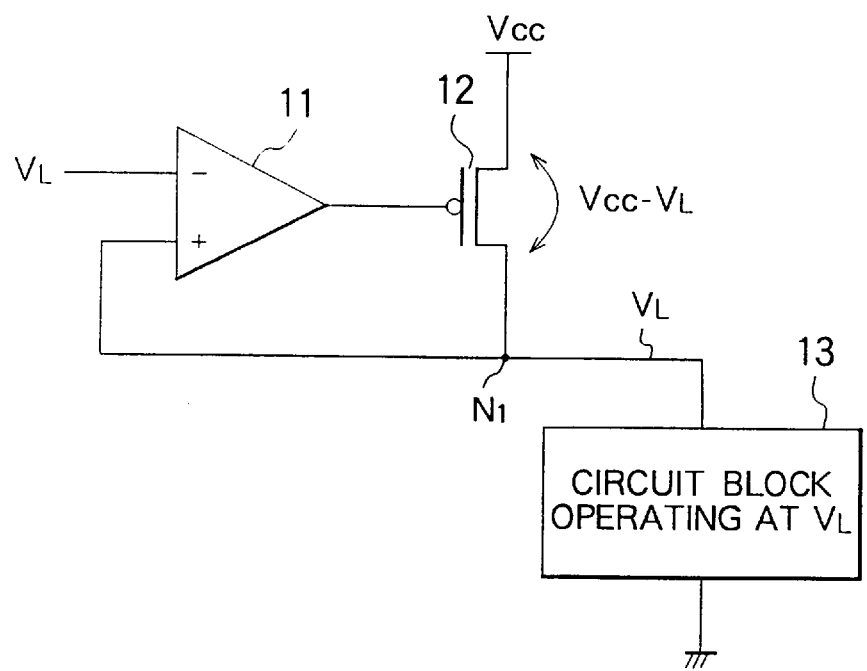
FIG. 13 is a circuit diagram of a fundamental configuration of a series regulator as a down converter used as an internal low voltage power supply circuit.

As this type of inner low voltage supply, a series regulator as shown in FIG. 13 is generally used.

This series regulator is constituted by, as shown in FIG. 13, an operational amplifier 11 with an inverted input (−) connected to the supply line of a constant voltage $V_L$, and a pMOS transistor 12 with a gate connected to the output of the operational amplifier 11, with a source connected to the supply line of the power supply voltage $V_{CC}$, and with a drain connected to a noninverted input (+) of the operational amplifier 1 and supplies a low voltage $V_L$ from a node $N_1$ to a circuit block 13.

When considering the power loss of the series regulator, there is a loss $P_{LS}$ due to the pMOS transistor 12 indicated by the following equation:

$$P_{LS}=(V_{CC}-V_L)\cdot i_L \qquad (3)$$

Then, when $V_L<(V_{CC}/2)$, the loss becomes 50 percent or more, which becomes a major obstacle to reduction of the power consumption of the LSI.

Particularly, where a lithium ion battery is used as the $V_{CC}$ external power supply, the fluctuation of the $V_{CC}$ is large and there arises a problem of the power loss thereof.

Therefore, a DC—DC converter which does not use an MOS transistor as a driver and is constituted only by capacitance elements and switches and with which a desired low voltage power supply potential can be obtained has been proposed.

Figure 14:
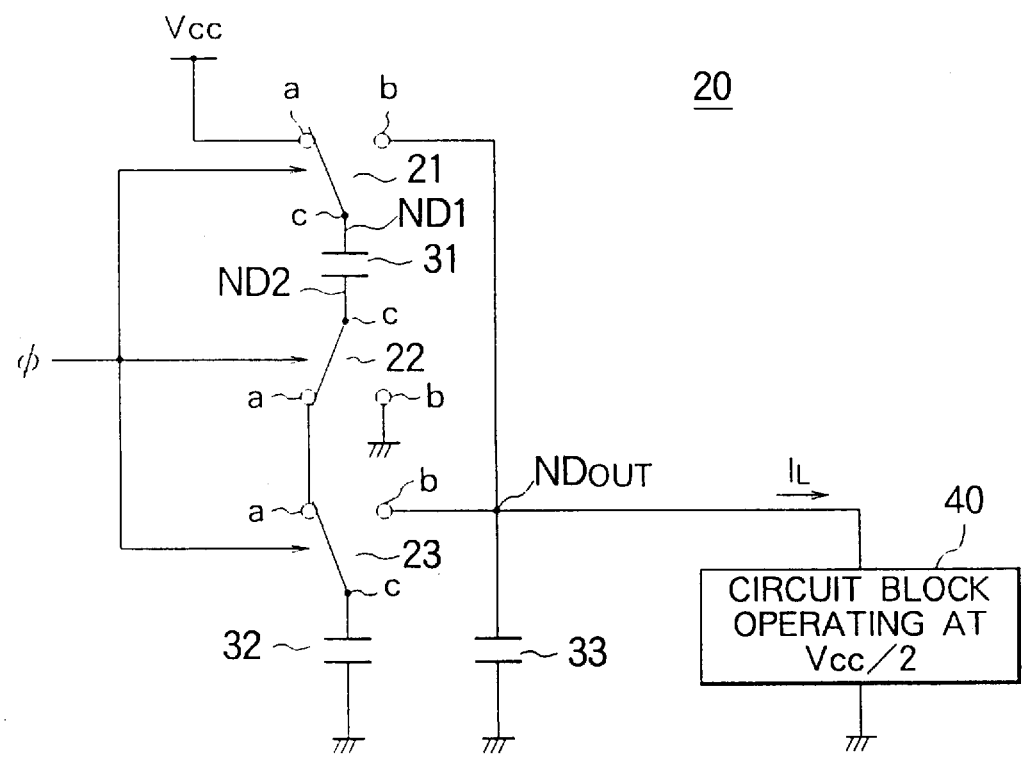
FIG. 14 is a circuit diagram of an example of the configuration of a capacitor switching type down converter.

FIG. 14 is a circuit diagram of an example of the configuration of this DC—DC converter.

As shown in FIG. 14, this DC—DC converter 20 is constituted by switch circuits 21 to 23 and capacitors 31 to 33. Note that, the switch circuits 21 to 23 are constituted by for example MOS type transistors. Also, as the capacitors 31 and 32, those having the same capacitance are used.

An operational contact a of the switch circuit 21 is connected to the supply line of the power supply voltage $V_{CC}$, an operational contact b is connected to an output node $ND_{OUT}$, and a fixed contact c is connected to one electrode of the capacitor 31.

The operational contact a of the switch circuit 22 is connected to the operational contact a of the switch circuit 23, the operational contact b is grounded, and the fixed contact c is connected to the other electrode of the capacitor 31.

The operational contact b of the switch circuit 23 is connected to the output node $ND_{OUT}$, and the fixed contact c is connected to one electrode of the capacitor 32. Then, the other electrode of the capacitor 32 is grounded.

Also, the capacitor 33 is a stabilizing capacitor which is connected between the output node $ND_{OUT}$ and the ground line for suppressing the voltage drop of the output node $ND_{OUT}$ by a load current $I_L$ and stabilizing the same. Note that, it is not necessary to provide this stabilizing capacitor 33 where the parasitic capacitance of the output power supply line is large.

The switch circuits 21, 22, and 23 connect their fixed contacts c to the operational contact a when the clock signal φ is at the $V_{CC}$ level (high level) and connect their fixed contacts c to the operational contact b when the clock signal φ is at the ground level (low level).

In such a configuration, when the clock signal φ is at a high level, two capacitors 31 and 32 are connected in series between the supply line of the power supply voltage $V_{CC}$ and the ground line to charge the capacitors 31 and 32.

When the clock signal φ is at a low level, two capacitors 31 and 32 are connected in parallel to discharge the same.

Next, since the capacitors 31 and 32 are constituted by elements having the same capacitance, due to the above charge and discharge function, the output voltage Va appearing at the output node $ND_{OUT}$ becomes $V_{CC}/2$, which is supplied to a circuit block 40 operating at this low voltage $V_{CC}/2$.

In the down converter shown in FIG. 14, when the nodes ND1 and ND2 are discharged from the power supply voltage $V_{CC}$ and 0.5 $V_{CC}$ to 0.5 $V_{CC}$ and 0 V, respectively, a power Pd indicated by the following equation is consumed:

$$Pd=(\tfrac{1}{2})\cdot(Cs1+Cs2)\cdot(V_{CC}/2)^2\cdot(1/\tau) \qquad (4)$$

Here, Cs1 and Cs2 are parasitic capacitances of the nodes ND1 and ND2.

Similarly, at the time of charging as well, the same amount of power is consumed and, as a result, a power P indicated by the following equation is consumed in total:

$$P=(\tfrac{1}{4})\cdot(Cs1+Cs2)\cdot(V_{CC}/\tau)^2 \qquad (5)$$

With the power consumption shown by equation (5), however, the demand for reduction of the power consumption of the LSI is not sufficiently satisfied, thus realization of a DC—DC converter with which a stable output voltage can be obtained with a further lower power loss has been desired.

Figure 15:
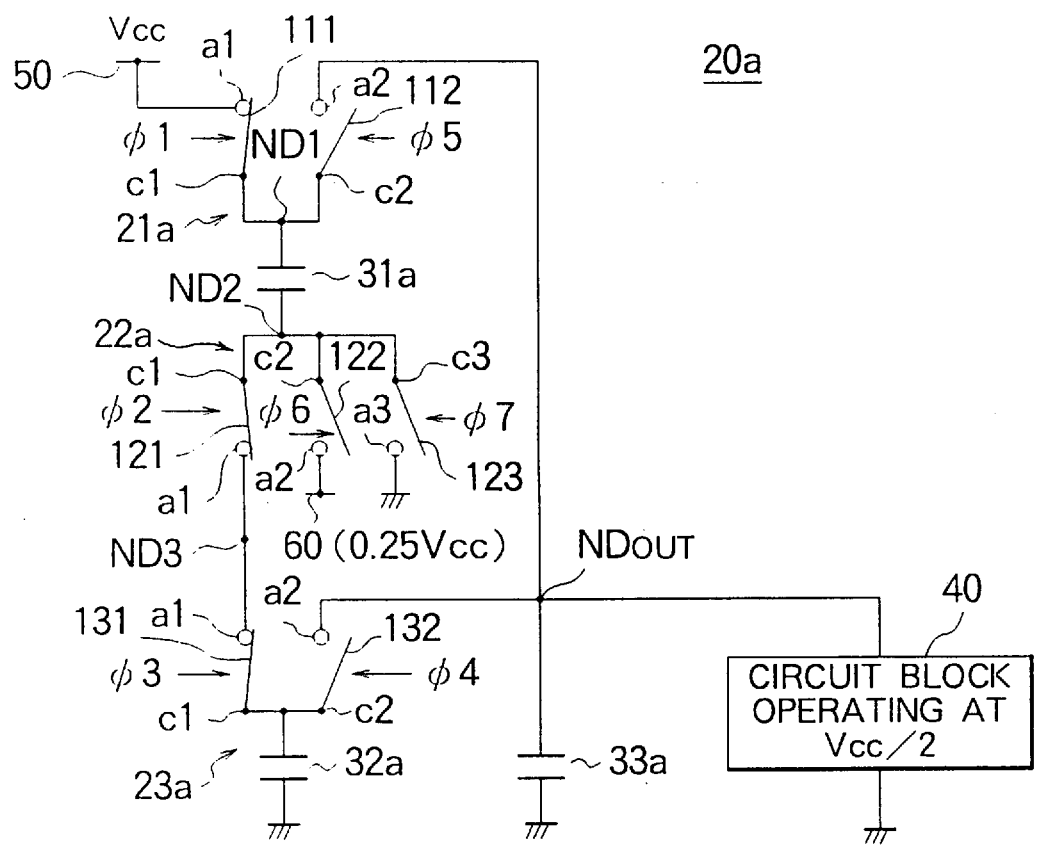
FIG. 15 is a circuit diagram of a third embodiment of the down converter according to the present invention.

FIG. 15 is a circuit diagram of a third embodiment of the DC—DC converter according to the present invention. Also, FIGS. 16A to 16J are timing charts of the circuit of FIG. 15.

As shown in FIG. 15, this DC—DC converter 20a is constituted by switch circuits 21a to 23a, capacitors 31a, 32a, and 33a, an external power supply 50 of the power supply voltage $V_{CC}$, a power supply 60 for 0.25 $V_{CC}$, and a timing generating circuit 70 generating the clock signals φ1 to φ7 at a timing shown in FIGS. 16A to 16F.

In the switch circuit 21a, fixed contacts c1 and c2 of two on-off switches 111 and 112 are connected in parallel to one electrode of the capacitor 31a, the operational contact a1 of the switch 111 is connected to the external power supply 50, and the operational contact a2 of the switch 112 is connected to the output node $ND_{OUT}$.

Then, the switch 111 is controlled on or off by the clock signal φ1, and the switch 112 is controlled on or off by the clock signal φ5.

More specifically, the switches 111 and 112 become the on state when the clock signal is at a high level and become the off state when it is at a low level. These on and off controls are complementarily carried out.

In the switch circuit 22a, the fixed contacts c1, c2, and c3 of the three on-off switches 121, 122, and 123 are connected in parallel to the other electrode of the capacitor 31a, and the operational contact a1 of the switch 121 is connected to the operational contact a1 of the switch 131 of the switch circuit 23a. The operational contact a2 of the switch 122 is connected to the power supply 60 for 0.25 $V_{CC}$, and the operational contact a3 of the switch 123 is grounded.

Then, the switch 121 is controlled on or off by the clock signal φ2, the switch 122 is controlled on or off by the clock signal φ6, and the switch 123 is controlled on or off by the clock signal φ7.

More specifically, the switches 121, 122, and 123 become the on state when the clock signal is at a high level and become the off state when it is at a low level. The on-off control of these switches 121, 122, and 123 is sequentially carried out.

In the switch circuit 23a, the fixed contacts c1 and c2 of the two on-off switches 131 and 132 are connected in parallel to one electrode of the capacitor 32a, and the operational contact a2 of the switch 132 is connected to the output node $ND_{OUT}$.

Then, the switch 131 is controlled on or off by the clock signal $\phi 3$, and the switch 112 is controlled on or off by the clock signal $\phi 4$.

More specifically, the switches 131 and 132 become the ON state when the clock signal is at a high level and become the off state when it is at a low level. These on and off controls are complementarily carried out.

Also, the other electrode of the capacitor 32a is grounded.

Note that, the switch circuits 21a to 23a are constituted by for example MOS system transistors.

Also, a stabilizing capacitor 33a for suppressing the voltage drop of the output node $ND_{OUT}$ by the load current $I_L$ is connected between the output node $ND_{OUT}$ and the ground line.

Note that, it is not necessary to provide this stabilizing capacitor 33a when the parasitic capacitance of the output power supply line is large.

Also, as the capacitors 31a and 32a, those having the same capacitance are used.

Figure 17:
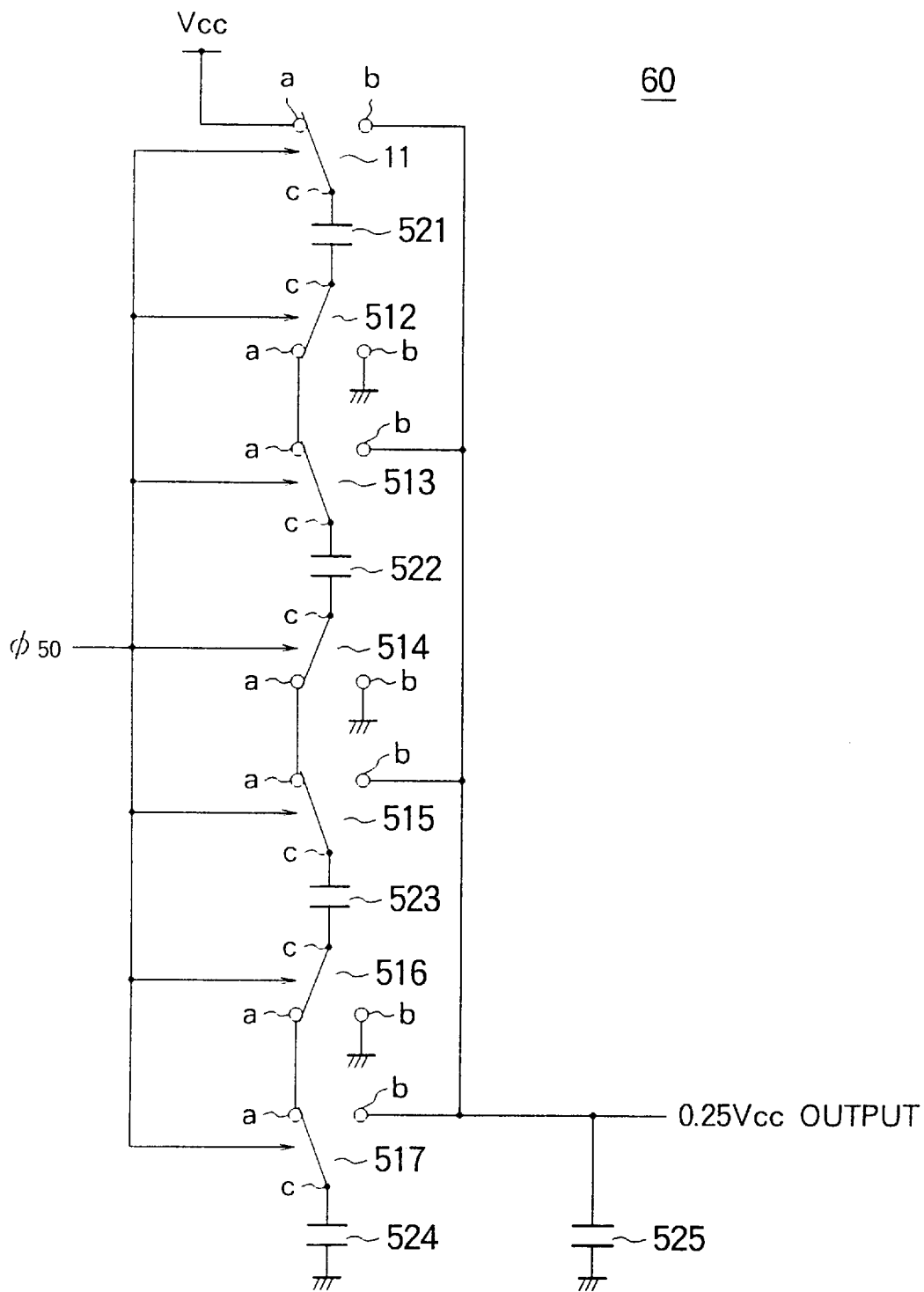
FIG. 17 is a circuit diagram of an example of the configuration of a power supply circuit for 0.25 $V_{CC}$ according to the present invention.

FIG. 17 is a circuit diagram of an example of the configuration of the power supply 60 for 0.25 $V_{CC}$.

This 0.25 $V_{CC}$ use power supply 60 is constituted by switch circuits 511 to 517 and capacitors 521 to 525 as shown in FIG. 17. Note that, the switch circuits 511 to 517 are constituted by for example MOS system transistors. Also, as the capacitors 521 to 524, those having the same capacitance are used.

The operational contact a of the switch circuit 511 is connected to the supply line of the power supply voltage $V_{CC}$, the operational contact b is connected to the output node $ND_{OUT}$, and the fixed contact c is connected to one electrode of the capacitor 521.

The operational contact a of the switch circuit 512 is connected to the operational contact a of the switch circuit 513, the operational contact b is grounded, and the fixed contact c is connected to the other electrode of the capacitor 521.

The operational contact b of the switch circuit 513 is connected to the output node $ND_{OUT}$, and the fixed contact c is connected to one electrode of the capacitor 522.

The operational contact a of the switch circuit 514 is connected to the operational contact a of the switch circuit 515, the operational contact b is grounded, and the fixed contact c is connected to the other electrode of the capacitor 522.

The operational contact b of the switch circuit 515 is connected to the output node $ND_{OUT}$, and the fixed contact c is connected to one electrode of the capacitor 523.

The operational contact a of the switch circuit 516 is connected to the operational contact a of the switch circuit 517, the operational contact b is connected to the output node $ND_{OUT}$, and the fixed contact c is connected to one electrode of the capacitor 524.

Further, the other electrode of the capacitor 524 is grounded.

Further, the capacitor 525 is a stabilizing capacitor which is connected between the output node $ND_{OUT}$ and the ground line for suppressing the voltage drop of the output node $ND_{OUT}$ by a load current $I_L$ and stabilizing the same.

Note that, it is not necessary to provide this stabilizing capacitor 525 when the parasitic capacitance of the output power supply line is large.

The switch circuits 511 to 517 connect their fixed contacts c to the operational contact a when the clock signal $\phi_{50}$ is at the $V_{CC}$ level (high level) and connect their fixed contacts c to the operational contact b when the clock signal $\phi_{50}$ is at the ground level (low level).

In the power supply 60 having such a configuration, when the clock signal $\phi_{50}$ is at a high level, the four capacitors 521, 522, 523, and 524 are connected in series between the supply line of the power supply voltage $V_{CC}$ and the ground line and the capacitors 521 to 524 are charged.

When the clock signal $\phi_{50}$ is at a low level, the four capacitors 421 to 424 are connected in parallel so the discharging is carried out.

The capacitors 521 to 524 are constituted by ones having the same capacitance, therefore, due to the above charge and discharge function, the output voltage Va appearing at the output node $ND_{OUT}$ becomes $V_{CC}/4=0.25\ V_{CC}$ which is supplied to the operational contact a2 of the switch 122 of the switch circuit 12a in the circuit of FIG. 15.

Figure 16:
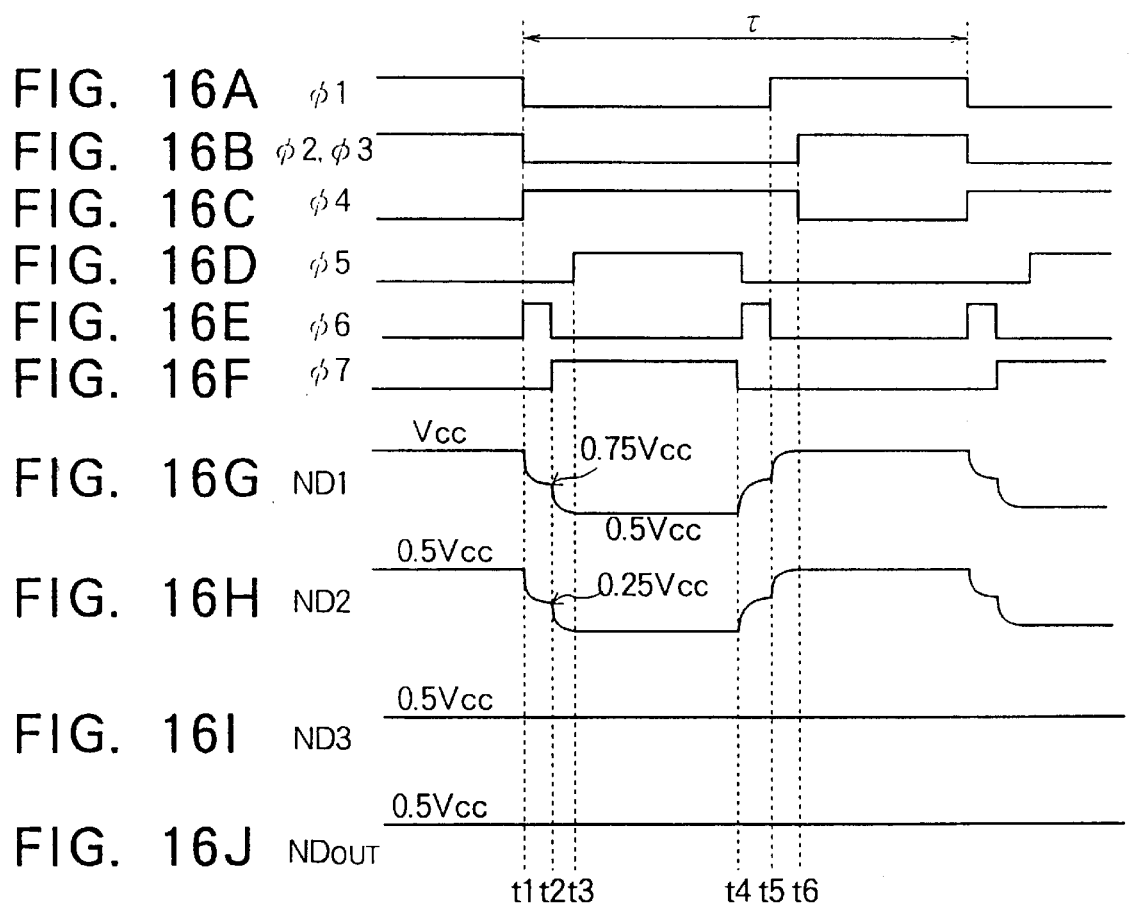
FIGS. 16A to 16J are timing charts of an operation of the third embodiment shown in FIG. 15.

The timing generating circuit 70 first sets the clock signals $\phi 1$ to $\phi 3$ at a high level as shown in FIG. 16, holds the switches 111, 121, and 131 in the on state, connects two capacitors 31a and 32a in series between the external power supply 50 and the ground line, and makes them perform the charging with respect to the capacitors 31a and 32a.

Subsequently, at a time t1, the clock signals $\phi 1$ to $\phi 3$ are switched to the low level, the clock signals $\phi 4$ and $\phi 6$ are set at a high level, the node ND2 is connected to the 0.25 $V_{CC}$ use power supply 60, and the charges of the capacitor 31a on the side connected to the node ND2 are discharged to the power supply 50.

Then, at a time t2 after an elapse of a predetermined time, the clock signal $\phi 6$ is switched to the low level, the clock signal $\phi 7$ is set at a high level, the node ND2 is connected to the ground line, and the capacitor 31a is discharged so that the node ND1 exhibits 0.5 $V_{CC}$ and node $ND_2$ exhibits 0 V.

Next, at a time t3, the clock signal $\phi 5$ is set at a high level, the node ND1 is connected to the output node $ND_{OUT}$, and 0.5 $V_{CC}$ ($V_{CC}/2$) is supplied to the output node $ND_{OUT}$.

Further, at a time t4, the clock signals $\phi 5$ and $\phi 7$ are switched to the low level, the clock signal $\phi 6$ is set at a high level, the node ND2 is connected to 0.25 $V_{CC}$ use power supply 60, and the capacitor 31a is charged so that the potential of the node ND1 changes from 0.5 $V_{CC}$ to 0.75 $V_{CC}$ and the potential of the node ND2 changes from 0 V to 0.25.

Next, at a time t5, the clock signal $\phi 6$ is switched to the low level, the clock signal $\phi 1$ is set at a high level, the node ND1 is connected to the external power supply 50, and the capacitor 31a is charged so that the potential of the node ND1 becomes $V_{CC}$ and the potential of the node ND2 becomes 0.5 $V_{CC}$.

Next, the operation by the above configuration will be explained by referring to the timing chart of FIG. 16.

First, the clock signals $\phi 1$, $\phi 2$, and $\phi 3$ among the clock signals $\phi 1$ to $\phi 7$ are set at a high level at the timing generating circuit 70, and the clock signal $\phi 1$ is supplied to the switch 111 of the switch circuit 21a, the clock signal $\phi 2$ is supplied to the switch 121 of the switch circuit 22a, and the clock signal $\phi 3$ is supplied to the switch circuit 131, respectively.

By this, the switches 111, 121, and 131 become the on state, the two capacitors 31a and 32a are connected in series between the external power supply 50 and the ground line, and the capacitors 31a and 32a are charged.

Next, at a time t1, the clock signals φ1 to φ3 are switched to the low level at the timing generating circuit 70, the clock signals φ4 and φ6 are set at a high level, the clock signal φ4 is supplied to the switch 132 of the switch circuit 23a, and the clock signal φ6 is supplied to the switch 122 of the switch circuit 22a, respectively.

By this, the switches 111, 121, and 131 become the off state, the switches 132 and 122 become the on state, and the supply of $V_{CC}/2$ to the capacitor 33a and the circuit block 40 is started.

Along with the switch 122 becoming the on state, the node ND2 is connected to the 0.25 $V_{CC}$ use power supply 60, and the charges of the capacitor 31a on the side connected to the node ND2 are discharged to the power supply 60. Here, via the switch 122, a charge of 0.25 $V_{CC}$ (Cs1+Cs2) flows into the power supply 50. The level of the node ND1 at this time is 0.75 $V_{CC}$.

In this case, at the switch 122, the power consumption shown by the following equation occurs.

$$P_{111} = (\tfrac{1}{2}) \cdot (Cs1=Cs2)^2 \cdot (V_{CC}/4)^2 \cdot (1/\tau) \qquad (6)$$

Here, Cs1 and Cs2 are parasitic capacitances of the nodes ND1 and ND2. The relationship with respect to the capacitance $C_{21}$ of the capacitor 31a is set as $C_{21} \gg Cs1, Cs2$.

Next, at a time t2, the clock signal φ6 is switched to the low level at the timing generating circuit 70, the clock signal φ7 is set at a high level, and the clock signal φ7 is supplied to the switch 123 of the switch circuit 22a.

By this, the switch 122 becomes the off state, and the switch 123 becomes the on state.

Along with the change of the switch 123 to the on state, the node ND2 is connected to the ground line. As a result, the capacitor 31a is discharged so that the node ND1 exhibits 0.5 $V_{CC}$ and the node ND2 exhibits 0 V.

In this case, at the switch 123, a power equivalent to the power indicated by the above equation (6) is consumed.

Then, at a time t3, the clock signal φ5 is set at a high level at the timing generating circuit 70 and is supplied to the switch 112 of the switch circuit 21a.

By this, the switch 112 becomes the off state, and 0.5 $V_{CC}$ ($V_{CC}/2$) is supplied to the output node $ND_{OUT}$.

Also, at a time t4, the clock signals φ5 and φ7 are switched to the low level at the timing generating circuit 70, the clock signal φ6 is set at a high level, and the clock signal φ6 is supplied to the switch 122 of the switch circuit 22a.

By this, the switches 122 and 123 become the off state, and the switch 122 becomes the on state.

Along with the change of the switch 122 to the on state, the node ND2 is connected to the 0.25 $V_{CC}$ use power supply 60. As a result, the capacitor 31a is charged so that the potential of the node ND1 changes from 0.5 $V_{CC}$ to 0.75 $V_{CC}$, and the potential of the node ND2 changes from 0 V to 0.25 $V_{CC}$.

In this case, at the switch 122, a power equivalent to the power indicated by the above equation (6) is consumed.

Here, charges of 0.25 $V_{CC}$ (Cs1+Cs2) flow out the power supply 60 via the switch 122. In this way, at the 0.25 $V_{CC}$ use power supply 60, an inflow and outflow of 0.25 $V_{CC}$ (Cs1+Cs2) occur by the charging and discharging, and the charges are recycled. For this reason, the frequency of the clock signal φ50 for the power supply 50 may be low, and there is almost no power loss due to the circuit of FIG. 15.

Next, at a time t5, the clock signal φ6 is switched to the low level at the timing generating circuit 70, the clock signal φ1 is set at a high level, and the clock signal φ1 is supplied to the switch 111 of the switch circuit 21a.

By this, the switch 122 becomes the off state, and the switch 111 becomes the on state.

Along with the switch 111 becoming the on state, the node ND1 is connected to the external power supply 40. As a result, the capacitor 31a is charged so that the potential of the node ND1 becomes $V_{CC}$ and the potential of the node ND2 becomes 0.5 $V_{CC}$.

In this case, at the switch 111, a power equivalent to the power indicated by the above equation (6) is consumed.

The power PT consumed by a series of discharging and charging operations is given by the following equation:

$$\begin{aligned} PT &= 4x(1/2) \cdot (Cs1 + Cs2) \cdot (V_{\infty}/4)^2 \cdot (1/\tau) \qquad (7)\\ &= 4x(1/8) \cdot (Cs1 + Cs2) \cdot V_{\infty}^2 \cdot (1/\tau) \end{aligned}$$

This power consumption is ½ of the power consumption $P=(\tfrac{1}{4}) \cdot (Cs1+Cs2) \cdot (V_{CC}/\tau)^2$ of the conventional circuit.

As explained above, according to the first embodiment, in a DC—DC converter wherein two capacitors 31a and 32a are connected in series between the external power supply and the reference power supply (ground) to be charged and are connected in parallel to give an output voltage Va of a value between the external power supply voltage and the reference power supply voltage by the clock signals φ1 to φ3, provision is made of a power supply 50 for potential lower than the external power supply 50 and the ground voltage source and provision is made of switches 121, 122, and 123 respectively operationally connecting the external power supply 50 and the power supply 60 for low potential with the capacitors 31a and a circuit 60 for sequentially switching the connection and nonconnection state from the switch side connected to the external power supply to charge and discharge the capacitors 31a and sequentially switching the connection and nonconnection state from the switch side connected to the ground voltage source side to discharge the capacitors 31a and thereby perform a heat insulating charging, therefore there is the advantage that a low voltage source with which a stable output voltage Va can be obtained with a low power loss can be realized.

Note that, in the present embodiment, a so-called two-step charging method was used, but by adopting an n number step charging method in which the number of switches of the switch circuit 22a is further increased to n, the power loss can be reduced to 1/n of that of the conventional method.

Note that, needless to say the number of connections of the capacitors is not limited to that of the present example, and a variety of modifications are possible.

Also, the switch circuit can be constituted by for example a transmission gate of the CMOS type, but desirably a p-channel MOS transistor and n-channel MOS transistor are selected and used corresponding to the transmission potential.

Also, so as to reduce the power loss, as the capacitor, desirably use is made of an external capacitance, high dielectric capacitance, MIM (metal-insulator-metal) configuration capacitance, DRAM trench or stack capacitance, planar capacitance, ferroelectric capacitance, or the like.

Particularly, a ferroelectric such as PZT has a relative dielectric constant larger than $SiO_2$ by two figures or more, and the parasitic capacitance can be sufficiently reduced.

Figure 18:
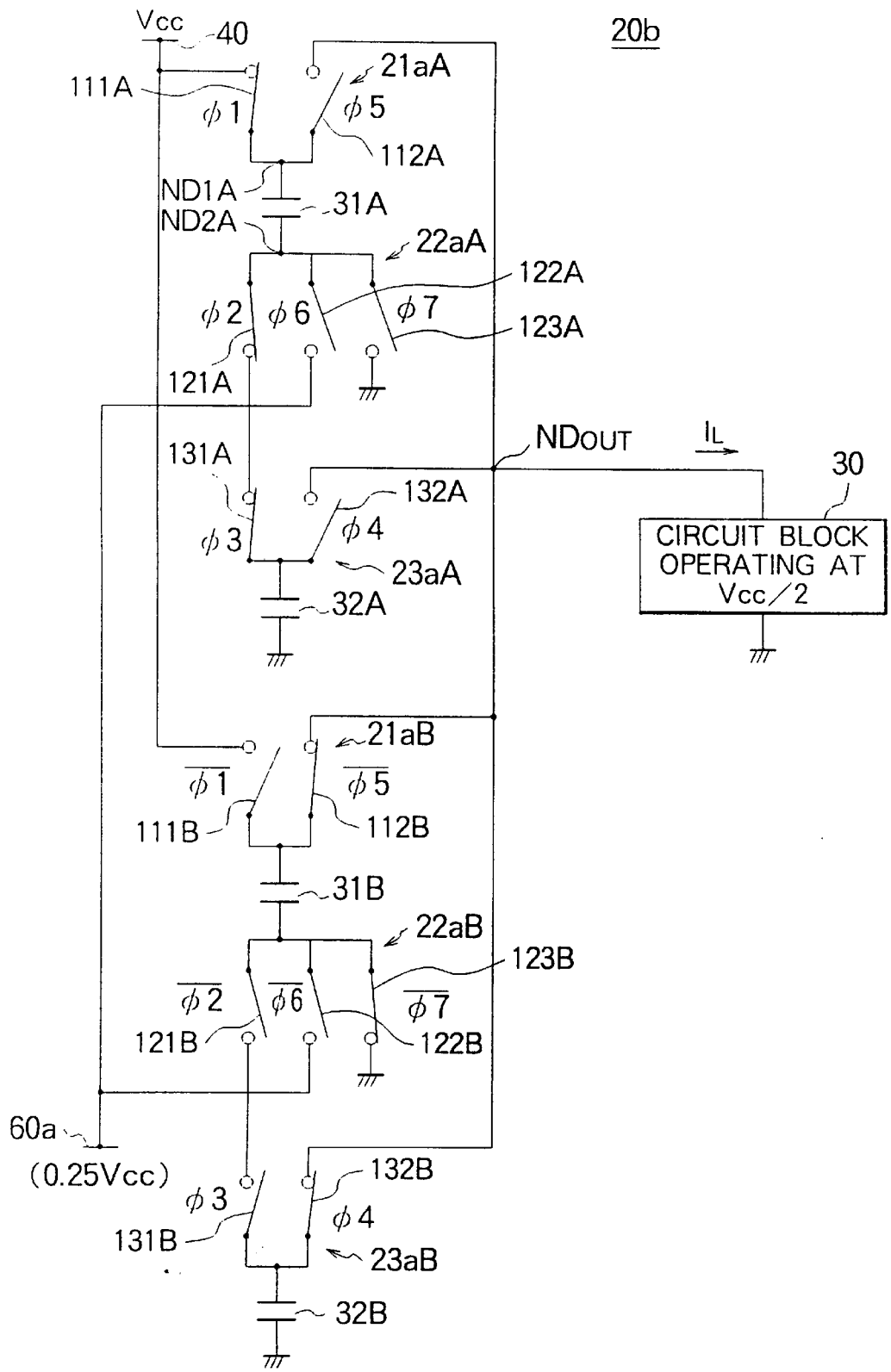
FIG. 18 is a circuit diagram of a fourth embodiment of a down converter according to the present invention.

FIG. 18 is a circuit diagram of a fourth embodiment of the DC—DC converter according to the present invention.

The difference of the present first embodiment from the above third embodiment resides in that the switch circuits and capacitor columns of the system A and system B are connected in parallel, and they are respectively driven by the clock signals φ1 to φ7 and $\overline{\phi 1}$ to $\overline{\phi 7}$ having inverse phases to each other (deviated by τ/2 phase).

Note that, the fundamental operation of the circuit per se is similar to that of the third embodiment, and therefore an explanation thereof is omitted here.

In such a configuration, in the circuit of the system A, when for example the nodes ND1A and ND2A are discharged to the 0.25 $V_{CC}$ use power supply 60a via the switch 122A from $V_{CC}$ and 0.5 $V_{CC}$ to 0.75 $V_{CC}$ and 0.25 $V_{CC}$, respectively, in the circuit of the system B, the charging operation is conversely carried out only by the same charge amount, therefore the both are cancelled. Accordingly, the supply of the charges from the 0.25 $V_{CC}$ use power supply 60a is 0, and there is an advantage that the 0.25 $V_{CC}$ use power supply 60a becomes very stable.

The ripple of the output node $ND_{OUT}$ accompanied with the load current $I_L$ can be lowered.

Many widely different embodiments of the present invention may be constructed without departing from the spirit and scope of the present invention. It should be understood that the present invention is not restricted to the specific embodiments described above.

What is claimed is:

1. An internal power supply circuit, comprising;
   a plurality of charge accumulating means,
   an input power supply terminal,
   a boasted voltage output terminal,
   a first switching means for connecting the plurality of charge accumulating means in parallel to each other in a first state,
   a second switching means for connecting the plurality of charge accumulating means in series with each other in a second state,
   wherein the first switching means comprises a third switching means and a fourth switching means, said third switching means connecting said charge accumulating means to a voltage supply line, and said fourth switching means connecting said charge accumulating means to ground; and
   a control means for energizing the first switching means or the second switching means in response to the first state or the second state to connect the plurality of charge accumulating means between the first power supply terminal and the second power supply terminal, and for deenergizing the first switching means or the second switching means in response to the first state or the second state to disconnect the plurality of charge accumulating means between the first power supply terminal and the second power supply terminal, the control means repeating the energizing and the deenergizing,
   a plurality of partial booster circuits each comprising one of said charge accumulating means connected between a first node and a second node,
   wherein the second switching means holds in a non-conductive state the first node of a first partial booster circuit and the second node of a rear partial booster circuit in the first state and in a conductive state in the second state;
   further wherein the third switching means and the fourth switching means are held in the conductive state and the second switching means is held in a non-conductive state in the first state; and
   further wherein the first switching means comprised of the third switching means and the fourth switching means is held in the non-conductive state and the second switching means is held in a conductive state in the second state so as to raise the voltage between the input terminal and the output terminal.

2. An internal power supply circuit according to claim 1, wherein the charge accumulating means are constituted by capacitors.

3. An internal power supply circuit according to claim 1, further comprising;
   a biasing means connected to the second node of the initial stage partial booster circuit for holding the second node at a constant potential and
   a rectifying means connected between the first node of the final stage partial booster circuit and a boosted voltage output terminal.

4. An internal power supply circuit according to claim 3, wherein the biasing means is constituted by a switching means set in the conductive state when the first switching means comprised of the third and fourth switching means is non-conductive.

5. An internal power supply circuit according to claim 3, wherein:
   the first power supply terminal is a positive power supply terminal and the second power supply terminal is a negative power supply terminal,
   the constant potential is the potential of the first power supply terminal,
   the biasing means is a rectification element connected so that a direction from the first power supply toward the second node of the initial stage partial booster circuit becomes a forward direction, and
   the rectification element is connected so that a direction from the first node of the final stage partial booster circuit toward the output terminal becomes the forward direction and supplies the positive boosted voltage to the output terminal.

6. An internal power supply circuit according to claim 3, wherein:
   the first power supply terminal is a negative power supply terminal and the second power supply terminal is a positive power supply terminal,
   the constant potential is the potential of the second power supply terminal,
   the biasing means is a rectification element connected so that a direction from the second node of the first stage partial booster circuit toward the first power supply terminal becomes the forward direction, and
   the rectification element is connected so that a direction from the output terminal to the first node of the final stage partial booster circuit becomes the forward direction and supplies the negative boosted voltage to the output terminal.

7. An internal power supply circuit according to claim 3, wherein;
   the third switching means is constituted by a first conductivity type insulation gate type field effect transistor with a gate electrode connected to an input terminal of a first clock, with one diffusion layer connected to the first power supply, and with another diffusion layer connected to the first node of the partial booster circuit;
   the fourth switching means is constituted by a first conductivity type insulation gate type field effect transistor with a gate electrode connected to an input terminal of a second clock, with one diffusion layer connected to the second power supply, and with another diffusion layer connected to the second node of the partial booster circuit; and
   the second switching means is constituted by a second conductivity type insulation gate type field effect transistor with a gate electrode connected to the input terminal of a third clock.

8. An internal power supply circuit according to claim 3, wherein
the biasing means is constituted by a second conductivity type insulation gate type field effect transistor with a gate electrode connected to the input terminal of a third clock.

9. An internal power supply circuit according to claim 7, wherein an amplitude of the first clock is set larger than a potential difference between the first power supply terminal and the second power supply terminal.

10. An internal power supply circuit according to claim 7, wherein the first power supply terminal is a positive power supply terminal and the first conductivity type insulation gate type field effect transistor is an n-channel type transistor and is held at a higher level than the first power supply terminal voltage in a high level section of the first clock.

11. An internal power supply circuit according to claim 7, wherein the first power supply is a negative power supply terminal and the first conductivity type insulation gate type field effect transistor is a p-channel type transistor and is held at a lower level than the second power supply terminal voltage in a low level section of the first clock.

12. An internal power supply circuit according to claim 7, wherein the second conductivity type insulation gate type field effect transistor constituting the second switching means is formed in an independent well.

13. An internal power supply circuit according to claim 8, wherein the biasing means is a second conductivity type insulation gate type field effect transistor formed in the same well as that for the second conductivity type insulator gate type field effect transistors constituting part of the peripheral logic circuit.

14. An internal power supply circuit according to claim 1, wherein
the charge accumulating means are constituted by capacitors;
the capacitors are connected in series between the first and second power supply terminals and then are charged in the second state; and
the capacitors are connected in parallel between the second power supply terminal and a down voltage output terminal in the first state to thereby obtain a voltage between the first and second power supply terminal.

15. An internal power supply circuit according to claim 14, further comprising;
a switching means connecting to an external power supply between the voltage of the first power supply terminal and the voltage of the second power supply terminal, having at least one sub-power supply of a potential lower than the external power supply, and operationally connects the external power supply and the sub-power supply and
a means for sequentially switching the connection and nonconnection state from the switching means connected to the external power supply to cause charging and discharging of the capacitors.

16. An internal power supply circuit according to claim 15, further comprising a means for sequentially switching the connection and nonconnection state from the switching means connected to the sub-power supply to cause charging and discharging of the capacitors.

17. An internal power supply circuit according to claim 15, wherein
at least two arrangements of a plurality of capacitors which are switched between the serial connection and parallel connection based on a clock signal and clock signals having inverse phases are supplied to the above at least two arrangements.

18. An internal power supply circuit according to claim 14, wherein the capacitors are composed of capacitors selected from ferroelectric capacitors, high dielectric capacitors, MIM (metal-insulator-metal) configuration capacitors, DRAM trench and stack capacitors, planar capacitors, external capacitors, and MIS (metal-insulator-semiconductor) gate capacitors.

19. An internal power supply circuit for boosting voltage comprising:
a plurality of charge storing devices;
a first plurality of transistors connected alternately and in series with said plurality of charge storing devices, wherein said series begins with a first transistor of said first plurality of transistors and ends with a last transistor of said first plurality of transistors;
a second plurality of transistors each of which is connected between a voltage supply line and a connection point between one of said plurality of charge storing devices and one of said first plurality of transistors; and
a third plurality of transistors each of which is connected between ground and a connection point between one of said plurality of charge storing devices and one of said first plurality of transistors;
wherein a gate of each of said first plurality of transistors, excluding said last transistor, is connected to a first clock line supplying a first clock signal;
further wherein a gate of each of said second plurality of transistors is connected to a second clock line supplying a second clock signal, different from said first clock signal; and
further wherein a gate of each of said third plurality of transistors is connected to a third clock line supplying a third clock signal, different from said second clock signal.

20. An internal power supply circuit according to claim 19, wherein said last transistor has a drain connected to an output terminal and a gate which is connected to said drain and to ground through a parasitic capacitance.

21. An internal power supply circuit according to claim 19, further comprising a clock circuit for generating said first, second and third clock signals, said clock circuit comprises a clock generator which comprises:
a first pair of transistors connected in series between ground and a voltage source line;
a second pair of transistors connected in series between ground and said voltage source line;
a capacitor connected between a first point and a second point, said first point being between said first pair of transistors and said second point being between said second pair of transistors; and
a clock output terminal connected to said second point, wherein said first clock signal is output to said clock output terminal.

22. An internal power supply circuit according to claim 21, wherein said first clock signal has a voltage amplitude greater than a voltage of said voltage source line.

23. An internal power supply circuit according to claim 21, wherein said clock circuit further comprises a plurality of flip-flops, wherein a first of said flip-flops has a set terminal which receives said second clock signal and an inverted output terminal which is connected to a gate of a first of said second pair of transistors.

24. An internal power supply circuit according to claim 23, wherein said first flip-flop has an output terminal which is connected to a set terminal of a second of said flip-flops, wherein said second flip-flop has a output terminal which is connected to a gate of a second of said second pair of transistors.

25. An internal power supply circuit according to claim 24, wherein said output terminal of said second flip-flop is connected to a set terminal of a third of said flip-flops, wherein said third flip-flop has an inverted output terminal which is connected to a first of said first pair of transistors.

26. An internal power supply circuit according to claim 24, wherein said second flip-flop has an inverted output terminal which is connected to a reset terminal of said first flip-flop.

27. An internal power supply circuit according to claim 25, wherein said inverted output terminal of said third flip-flop is connected to a reset terminal of said second flip-flop.

28. An internal power supply circuit according to claim 25, wherein said third flip-flop has an output terminal which is connected to a set terminal of a fourth of said flip-flops, said fourth flip-flop having an output terminal is connected to a second of said first pair of transistors.

29. An internal power supply circuit according to claim 28, wherein said output of said fourth flip-flop is connected through a delay element to a set terminal of a fifth of said flip-flops; said fifth flip-flop having an inverted output terminal which outputs said second clock signal.

30. An internal power supply circuit according to claim 29, wherein said inverted output terminal of said first flip-flop is connected to a reset terminal of a sixth of said flip-flops, said sixth flip-flop having an output terminal which outputs said third clock signal and an inverted output terminal which is connected through a delay element to a set terminal of said flip-flop.

31. An internal power supply circuit according to claim 30, wherein said output terminal of said sixth flip-flop is connected to a reset terminal of said fifth flip-flop.

32. An internal power supply circuit according to claim 19, wherein said first plurality of transistors are p-type transistors, and said second and third pluralities of transistors are n-type transistors.

33. An internal power supply circuit according to claim 19, wherein said first plurality of transistors are n-type transistors, and said second and third pluralities of transistors are p-type transistors.

34. An internal power supply circuit according to claim 19, wherein said charge storing devices are capacitors.

35. An internal power supply circuit according to claim 19, further comprising a power supply input terminal connected to a source of said first transistor.

36. An internal power supply circuit, according to claim 19, wherein:

the second plurality of transistors, when turned ON, connect the plurality of charge storing devices in parallel to said voltage supply line, and the first plurality of transistors, when turned ON, connect the plurality of charge storing devices in series with each other.

37. An internal power supply circuit according to claim 19, wherein:

when said first plurality of transistors are turned ON and said second plurality of transistors are turned OFF, said first transistor acts as a biasing means for holding a connection node between said first transistor and one of said charge storing devices at a constant potential, and said last transistor acts as a rectifying means connected between said series and a boosted voltage output terminal.

38. An internal power supply circuit according to claim 19, wherein said plurality of charge storing devices equals three charge storing devices.

* * * * *